United States Patent
Papasakellariou et al.

(10) Patent No.: US 9,019,872 B2
(45) Date of Patent: Apr. 28, 2015

(54) GENERATION OF HARQ-ACK INFORMATION AND POWER CONTROL OF HARQ-ACK SIGNALS IN TDD SYSTEMS WITH DOWNLINK OF CARRIER AGGREGATION

(71) Applicant: Samsung Electronics Co., Ltd., Suwon-si, Gyeonggi-do (KR)

(72) Inventors: Aris Papasakellariou, Houston, TX (US); Joon-Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/564,617

(22) Filed: Dec. 9, 2014

(65) Prior Publication Data

US 2015/0092633 A1  Apr. 2, 2015

Related U.S. Application Data

(63) Continuation of application No. 14/294,841, filed on Jun. 3, 2014, now Pat. No. 8,908,574, which is a continuation of application No. 13/958,908, filed on Aug. 5, 2013, now Pat. No. 8,780,870, which is a (Continued)

(51) Int. Cl.
  *H04J 3/10* (2006.01)
  *H04W 72/04* (2009.01)
  *H04L 5/14* (2006.01)

(52) U.S. Cl.
  CPC ............. *H04W 72/0413* (2013.01); *H04L 5/14* (2013.01)

(58) Field of Classification Search
  None
  See application file for complete search history.

(56) References Cited

U.S. PATENT DOCUMENTS 8,891,479 B2 * 11/2014 Yang et al. ............... 370/329
2006/0093024 A1  5/2006 Pietraski et al.

(Continued)

FOREIGN PATENT DOCUMENTS

| KR | 10-2007-0086940 A | 8/2007 |
| KR | 10-2008-0074698 A | 8/2008 |
| KR | 10-2010-0050633 A | 5/2010 |

OTHER PUBLICATIONS

XP 050417605, 3rd Generation Partnership Project; Technical Specification Group Radio Access Network; Evolved Universal Terrestrial Radio Access (E-UTRA); Physical layer procedures (Release 9), 3GPP Draft, DRAFT36213-910, 3rd Generation Partnership Project, Mobile Competence Centre, 650, Route Des Lucioles, France, vol. RAN WG1, Mar. 22, 2010.

(Continued)

*Primary Examiner* — Duc C Ho
(74) *Attorney, Agent, or Firm* — Jefferson IP Law, LLP

(57) ABSTRACT

Methods and apparatus are provided for a User Equipment (UE) configured to have multiple cells in a DownLink (DL) of a Time Division Duplex (TDD) communication system so as to determine a power of an acknowledgement signal that the UE transmits in a control channel and to determine a number of acknowledgement information bits that the UE multiplexes with data information bits in a data channel. A transmission power of the control signal is determined based on DL Assignment Index (DAI) Information Elements (IEs) in DL Scheduling Assignments (SAs) that the UE detects through multiple transmission time intervals and through the multiple configured DL cells. The number of acknowledgement information bits in the data channel is determined based on a DAI IE of an UpLink (UL) SA associated with the transmission of the data channel.

20 Claims, 15 Drawing Sheets

Related U.S. Application Data continuation of application No. 13/288,317, filed on Nov. 3, 2011, now Pat. No. 8,520,560.

(60) Provisional application No. 61/409,662, filed on Nov. 3, 2010.

(56) References Cited

U.S. PATENT DOCUMENTS

| | | |
|---|---|---|
| 2010/0323647 A1 | 12/2010 | Ryu et al. |
| 2011/0243012 A1 | 10/2011 | Luo et al. |
| 2012/0034927 A1 | 2/2012 | Papasakellariou et al. |
| 2012/0039280 A1 | 2/2012 | Chen et al. |
| 2012/0076105 A1 | 3/2012 | Yang et al. |
| 2012/0099491 A1 | 4/2012 | Lee et al. |
| 2012/0314674 A1 | 12/2012 | Seo et al. |
| 2013/0176929 A1* | 7/2013 | Yang et al. .................... 370/311 |
| 2013/0182676 A1 | 7/2013 | Lee et al. |
| 2013/0188592 A1* | 7/2013 | Yang et al. .................... 370/329 |

OTHER PUBLICATIONS

XP 050420331, DAI design for LTE-A TDD, 3GPP Draft, R1-102999, 3rd Generation Partnership Project, Mobile Competence Centre, 650, Route Des Lucioles, France, vol. RAN WG1, no. Montreal, Canada, May 5, 2010.

XP 050450516, PUCCH Power Control for DL CA, 3GPP Draft, R1-105367, 3rd Generation Partnership Project, Mobile Competence Centre, 650, Route Des Lucioles, France, vol. RAN WG1, no. Xi'an, May 5, 2010.

XP 050449872, Need for DAI and HARQ-ACK Transmission Aspects with CA, 3GPP Draft, R1-104576 DAI for A N in PUSCH, 3rd Generation Partnership Project, Mobile Competence Centre, 650, Route Des Lucioles, France, vol. RAN WG1, no. Madrid, Spain, 010-08-17.

\* cited by examiner

US 9,019,872 B2

GENERATION OF HARQ-ACK INFORMATION AND POWER CONTROL OF HARQ-ACK SIGNALS IN TDD SYSTEMS WITH DOWNLINK OF CARRIER AGGREGATION

CROSS-REFERENCE TO RELATED APPLICATION

This application is a continuation application of a prior application Ser. No. 14/294,841, filed on Jun. 3, 2014, which is a continuation application of U.S. patent application Ser. No. 13/958,908 filed Aug. 5, 2013, which claims the benefit of U.S. patent application Ser. No. 13/288,317 filed Nov. 3, 2011 in the U.S. Patent and Trademark Office, which claims benefit under 35 U.S.C. §119(e) of U.S. Provisional Application No. 61/409,662, filed on Nov. 3, 2010, in the United States Patent and Trademark Office, the disclosure of which is incorporated herein in its entirety by reference.

BACKGROUND OF THE INVENTION

1. Field of the Invention

The present invention is generally directed to a wireless communication systems and, more specifically, to the transmission of acknowledgement information in an uplink of a communication system.

2. Description of the Art

A communication system includes a DownLink (DL) that conveys transmission signals from a Base Station (BS), or NodeB, to User Equipment (UE) and an UpLink (UL) that transmits signals from UEs to the NodeB. A UE, also commonly referred to as a terminal or a mobile station, may be fixed or mobile and may be a wireless device, a cellular phone, a personal computer device, a mobile electronic device, or any other similar fixed or mobile electronic device. A NodeB is generally a fixed station and may also be referred to as an access point or some other equivalent terminology.

More specifically, the UL transmits data signals carrying information content, of control signals providing control information associated with the transmission of data signals in the DL, and of Reference Signals (RSs), which are commonly referred to as pilot signals. The DL also conveys transmissions of data signals, control signals, and RSs.

UL data signals are transmitted through a Physical Uplink Shared CHannel (PUSCH) and DL data signals are conveyed through a Physical Downlink Shared CHannel (PDSCH). In a case where a PUSCH transmission does not occur, a UE conveys UL Control Information (UCI) through a Physical Uplink Control CHannel (PUCCH). However, when a PUSCH transmission occurs, a UE may convey UCI together with data through the PUSCH.

DL control signals may be broadcast or sent in a manner that is UE-specific. Accordingly, UE-specific control channels can be used, among other purposes, to provide UEs with Scheduling Assignments (SAs) for PDSCH reception, or in other words, a DL SA, or a PUSCH transmission, or in other words, a UL SA. The SAs are transmitted from the NodeB to respective UEs using DL Control Information (DCI) formats through respective Physical DL Control CHannels (PDCCHs).

The NodeB may configure a UE through higher layer signaling, such as Radio Resource Control (RRC) signaling, a PDSCH and a PUSCH Transmission Mode (TM). The PDSCH TM or PUSCH TM is respectively associated with a DL SA or a UL SA and defines whether the respective PDSCH or PUSCH conveys one data Transport Block (TB) or two data TBs.

PDSCH or PUSCH transmissions are either scheduled to be assigned to a UE by the NodeB through higher layer signaling or through physical layer signaling, such as PDCCH signaling, using a respective DL SA or UL SA, or correspond to non-adaptive retransmissions for a given Hybrid Automatic Repeat reQuest (HARQ) process. Scheduling by higher layer signaling is referred to as Semi-Persistent Scheduling (SPS), and scheduling by PDCCH is referred to as dynamic scheduling. A PDCCH may also be used to release a SPS PDSCH or a SPS PDSCH. If a UE misses a PDCCH, or in other words, fails to detect a PDCCH, it also misses the associated PDSCH or PUSCH. This event will be referred to as a Discontinuous Transmission (DTX).

The UCI includes ACKnowledgment (ACK) information associated with a HARQ process, i.e., a HARQ-ACK. The HARQ-ACK information may consist of multiple bits corresponding to positive ACKs for TBs the UE correctly received or negative acknowledgements (NACKs) for TBs the UE incorrectly received. In a case where a UE does not receive a TB, it may transmit a DTX, which includes tri-state HARQ-ACK information, or both the absence and the incorrect reception of a TB can be represented by a NACK (in a combined NACK/DTX state). One consequence of a UE not conveying a DTX to the NodeB is that Incremental Redundancy (IR) cannot be used for its HARQ process. This leads to throughput loss. Another consequence is that PDCCH power control, based on DTX feedback, is not possible.

In Time Division Duplex (TDD) systems, DL and UL transmissions occur in different Transmission Time Intervals (TTIs) which are referred to as subframes. For example, in a frame comprising of 10 subframes, some subframes may be used for DL transmissions and some may be used for UL transmissions.

FIG. 1 illustrates a frame structure for a TDD system according to the related art.

Referring to FIG. 1, a 10 millisecond (ms) frame consists of two identical 5 ms half-frames. Each 5 ms half-frame 110 is divided into 8 slots 120 and 3 special fields: a DL Pilot Time Slot (DwPTS) 130, a Guard Period (GP) 140, and an UL Pilot Time Slot (UpPTS) 150. The length of DwPTS+GP+UpPTS is one subframe 160 and is 1 ms long. The DwPTS may be used for the transmission of synchronization signals from the NodeB while the UpPTS may be used for the transmission of random access signals from UEs. The GP facilitates the transition between DL and UL transmissions by absorbing transient interference.

The number of DL subframes and the number of UL subframes per frame can be different from each other and multiple DL subframes may be associated with a single UL subframe. The association between the multiple DL subframes and the single UL subframe is in the sense that HARQ-ACK information of bits generated in response to PDSCH receptions (which are data TBs) in the multiple DL subframes needs to be transmitted in the single UL subframe. This number of DL subframes is referred to as the bundling window and, in the example of FIG. 1, it is usually smaller than or equal to 4 subframes and it is always smaller than or equal to 9 subframes.

One method for a UE to convey HARQ-ACK information in a single UL subframe, in response to receiving PDSCHs in multiple DL subframes, is HARQ-ACK bundling where the UE transmits an ACK only if it correctly receives all data TBs, otherwise, the UE transmits a NACK. Therefore, HARQ-ACK bundling results in unnecessary retransmissions and reduced DL throughput as a NACK is transmitted even when a UE incorrectly receives only one data TB and correctly receives all other data TBs.

Another method for a UE to convey HARQ-ACK information in a single UL subframe, in response to receiving data TBs in multiple DL subframes, is HARQ-ACK multiplexing, which is based on PUCCH resource selection.

Yet another method for a UE to convey HARQ-ACK information in a single UL subframe, in response receiving data TBs in multiple DL subframes, is joint coding of the HARQ-ACK bits using, for example, a block code such as the Reed-Mueller (RM) code, which will be described below. The primary focus of the descriptions herein is on joint coding of HARQ-ACK bits. Although the transmission of HARQ-ACK information was described for brevity only for a PUCCH, the coding method is fundamentally the same for transmission in a PUSCH.

If a PDSCH conveys one TB, the respective HARQ-ACK information consists of one bit which is encoded as a binary '1' if the TB is correctly received, such that the binary '1' indicates an ACK, and is encoded as a binary '0' if the TB is incorrectly received, such that the binary '0' indicates a NACK. If a PDSCH conveys two TBs, in accordance with the Single User-Multiple Input Multiple Output (SU-MIMO) transmission method with a rank higher than one, the HARQ-ACK information consists of two bits $[o_0^{ACK} \ o_1^{ACK}]$ with $o_0^{ACK}$ corresponding to the first TB and $o_1^{ACK}$ corresponding to the second $TB_{max}$. If a UE applies bundling in the spatial domain, it generates only one HARQ-ACK bit. The transmission of one HARQ-ACK bit may use repetition coding and the transmission of two HARQ-ACK bits may use a (3, 2) simplex code.

FIG. 2 illustrates a PUSCH transmission structure according to the related art.

Referring to FIG. 2, the subframe 210 includes two slots. Each slot 220 includes $N_{symb}^{UL}$ symbols used to transmit data, a HARQ-ACK, or a RS. Each symbol 230 includes a Cyclic Prefix (CP) to mitigate interference due to channel propagation effects. The PUSCH transmission in one slot may be either at a same BandWidth (BW) or at a different BW than in the other slot. Some symbols in each slot are used to transmit RS 240, which enables channel estimation and coherent demodulation of the received data and/or HARQ-ACK information. The transmission BW consists of frequency resource units which will be referred to as Physical Resource Blocks (PRBs). Each PRB includes $N_{sc}^{RB}$ sub-carriers, or Resource Elements (REs), and a UE is allocated $M_{PUSCH}$ PRBs 250 for a total of $M_{sc}^{PUSCH}=M_{PUSCH}\cdot N_{sc}^{RB}$ REs for the PUSCH transmission BW.

The last subframe symbol may be used for transmitting a Sounding RS (SRS) 260 from one or more UEs. The SRS provides the NodeB an estimate of the channel medium the respective UE experiences over the SRS transmission BW. The NodeB configures to each UE the SRS transmission parameters through higher layer signaling such as RRC signaling. The number of subframe symbols available for data transmission is $N_{symb}^{PUSCH}=2\cdot(N_{symb}^{UL}-1)-N_{SRS}$, where $N_{SRS}=1$ if the last subframe symbol is used for SRS transmission and $N_{SRS}=0$ otherwise.

Each RS or SRS is assumed to be constructed using a Constant Amplitude Zero Auto-Correlation (CAZAC) sequence. Orthogonal multiplexing of CAZAC sequences can be achieved by applying different Cyclic Shifts (CSs) to the same CAZAC sequence.

FIG. 3 illustrates a transmitter for transmitting data and HARQ-ACK in a PUSCH according to the related art.

Referring to FIG. 3, encoded HARQ-ACK bits 320 are inserted by puncturing encoded data bits 310 by the data puncturing unit 330. A Discrete Fourier Transform (DFT) is then performed by the DFT unit 340. The REs for the PUSCH transmission BW are selected by the sub-carrier mapping unit 350 as instructed from a controller 355. An Inverse Fast Fourier Transform (IFFT) is performed by an IFFT unit 360, CP insertion is performed by a CP insertion unit 370, and time windowing is performed by a filter 380, thereby generating a transmitted signal 390. For brevity, the encoding and modulation processes and additional transmitter circuitry such as a digital-to-analog converter, analog filters, amplifiers, and transmitter antennas are not illustrated.

The PUSCH transmission is assumed to be over a single cluster 395A or over multiple clusters 395B of contiguous REs in accordance to the DFT Spread Orthogonal Frequency Division Multiple (DFT-S-OFDM) method for signal transmission.

FIG. 4 illustrates a receiver for receiving a transmission signal as illustrated in FIG. 3 according to the related art.

Referring to FIG. 4, an antenna receives a Radio-Frequency (RF) analog signal and after further processing by units such as filters, amplifiers, and analog-to-digital converters, which are not shown for the purpose of brevity, a received digital signal 410 is filtered by a filter 420 for time windowing and the CP is removed by CP removal unit 430. Subsequently, the receiver unit applies a FFT by an FFT unit 440, selects the REs used by the transmitter by sub-carrier de-mapping by a sub-carrier demapping unit 450 under a control of controller 455. Thereafter, an Inverse DFT (IDFT) unit 460 performs an IDFT, an extraction unit 470 extracts the HARQ-ACK bits and places erasures at the respective REs for the data bits, and finally generates the data bits 480.

Assuming for simplicity that the PUSCH conveys a single data TB, for HARQ-ACK transmission in a PUSCH a UE determines the respective number of encoded HARQ-ACK symbols as shown in Equation (1)

$$Q' = \min\left(\left\lceil\frac{O_{HARQ-ACK}\cdot \beta_{offset}^{HARQ-ACK}}{Q_m\cdot R}\right\rceil, 4\cdot M_{sc}^{PUSCH}\right) \quad \text{Equation (1)}$$

In Equation (1), $O_{HARQ-ACK}$ is a number of HARQ-ACK information bits, also referred to as a HARQ-ACK payload, $\beta_{offset}^{HARQ-ACK}$ is a parameter that the NodeB conveys to the UE through higher layer signaling, $Q_m$ is a number of data information bits per modulation symbol ($Q_m$=2, 4, 6 for Quadrature Phase Shift Keying (QPSK), Quadrature Amplitude Modulation (QAM) 16, QAM64, respectively), R is a data code rate of an initial PUSCH transmission for the same TB, $M_{sc}^{PUSCH}$ is a PUSCH transmission BW in a current subframe, and $\lceil\ \rceil$ is the ceiling function that rounds a number to a next integer.

The data code rate is defined as shown in Equation (2)

$$R = \left(\sum_{r=0}^{CB-1} K_r\right) / (Q_m\cdot M_{sc}^{PUSCH-initial}\cdot N_{symb}^{PUSCH-initial}) \quad \text{Equation (2)}$$

In Equation (2), CB is a total number of data code blocks, $K_r$ is a number of bits for a data code block number r, $N_{symb}^{PUSCH-initial}$ is a number of subframe symbols for the initial PUSCH transmission of the same TB and $M_{sc}^{PUSCH-initial}$ is a number of respective REs for the PUSCH transmission BW. The maximum number of encoded HARQ- ACK symbols is limited to the number of REs in 4 DFT-S-OFDM symbols ($4 \cdot M_{sc}^{PUSCH}$) which may be located in the two subframe symbols adjacent to the RS in each of the two subframe slots, as shown in FIG. 2. The determination of the number of encoded HARQ-ACK symbols in a case where a PUSCH conveys multiple TBs, using for example the SU-MIMO transmission method, is similar to the case where a PUSCH conveys one TB, and thus, a respective description is omitted for brevity.

FIG. 5 illustrates a PUCCH structure in one subframe slot for the transmission of multiple HARQ-ACK information bits using the DFT-S-OFDM transmission method according to the related art.

Referring to FIG. 5, after encoding and modulation, using respectively, for example, a RM block code and QPSK (not shown for brevity), a set of the same HARQ-ACK bits 510 is multiplied by mixer 520 with elements of an Orthogonal Covering Code (OCC) 530 and is subsequently DFT precoded by the precoder unit 540. For example, for 5 symbols per slot carrying HARQ-ACK bits, the OCC has a length of 5 {OCC(0), OCC(1), OCC(2), OCC(3), OCC(4)} and can be either of {1, 1, 1, 1, 1}, or {1, exp(j2π/5), exp(j4π/5), exp(j6π/5), exp(j8π/5)}, or {1, exp(j4π/5), exp(j8π/5), exp(j2π/5), exp(j6π/5)}, or {1, exp(j6π/5), exp(j2π/5), exp(j8π/5), exp (j4π/5)}, or {1, exp(j8π/5), exp(j6π/5), exp(j4π/5), exp(j2π/5)}. The output of the DFT precoder is passed through an IFFT unit 550 and it is then mapped to a DFT-S-OFDM symbol 560.

As the previous operations are linear, their relative order may be inter-changed. Because the PUCCH transmission is assumed to be in one PRB which consists of $N_{sc}^{RB}=12$ REs, there are 24 encoded HARQ-ACK bits transmitted in each slot (which includes 12 HARQ-ACK QPSK symbols) and a (32, $O_{HARQ\text{-}ACK}$) RM code is punctured into a (24, $O_{HARQ\text{-}ACK}$) RM code. The same or different HARQ-ACK bits may be transmitted in the second subframe slot. A RS is also transmitted in each slot to enable coherent demodulation of the HARQ-ACK signals. The RS is constructed from a CAZAC sequence 570, having a length of 12, which is passed through an IFFT 580 and mapped to another DFT-S-OFDM symbol 590.

The PUCCH structure of FIG. 5 can only support limited HARQ-ACK payloads without incurring a large coding rate because it can only support 24 encoded HARQ-ACK bits. For example, a single RM code can be used for HARQ-ACK payloads up to 10 bits and a dual RM code can be used for HARQ-ACK payloads between 11 and 20 bits. With a dual RM code, the mapping to successive elements of the DFT can alternate between elements from the output of a first RM code and elements from the output of a second RM code in a sequential manner, which is not shown for brevity. For HARQ-ACK payloads of more than 20 bits, convolutional coding can be used.

FIG. 6 illustrates a UE transmitter block diagram for HARQ-ACK signals in a PUCCH according to the related art.

Referring to FIG. 6, the HARQ-ACK information bits 605 are encoded and modulated by an encoder and modulator 610 and then multiplied with an element of the OCC 625 for the respective DFT-S-OFDM symbol by a mixer 620. The output of the mixer 620 is then precoded by a DFT precoder 630. After DFT precoding, sub-carrier mapping is performed by a sub-carrier mapper 640, under control of controller 650. Thereafter, the IFFT is performed by an IFFT unit 660, a CP is added by a CP inserter 670, and the signal is filtered by a filter 680 for time windowing, thereby generating a transmitted signal 690. For brevity, additional transmitter circuitry, such as a digital-to-analog converter, analog filters, amplifiers, and transmitter antennas are not illustrated in FIG. 6.

FIG. 7 illustrates a NodeB receiver block diagram for HARQ-ACK signals according to the related art.

Referring to FIG. 7, after receiving a Radio-Frequency (RF) analog signal and converting it to a digital received signal 710, the digital received signal 710 is filtered by a filter 720 for time windowing and a CP is removed by a CP remover 730. Subsequently, the NodeB receiver applies a FFT by a FFT unit 740, performs sub-carrier demapping by a sub-carrier demapper 750 under the control of a controller 755, and applies an Inverse DFT (IDFT) by an IDFT unit 760. The output of the IDFT unit 760 is then multiplied with an OCC element 775 for the respective DFT-S-OFDM symbol by a mixer 770. An adder 780 sums the outputs for the DFT-S-OFDM symbols conveying HARQ-ACK signals over each slot, and a demodulator and decoder 790 demodulates and decodes the summed HARQ-ACK signals over both subframe slots in order to obtain the HARQ-ACK information bits 795.

In TDD systems, as a UE needs to transmit HARQ-ACK information corresponding to potential TB receptions over multiple DL subframes, a DL Assignment Index (DAI) Information Element (IE), or DL DAI IE, $V_{DAI}^{DL}$, is included in each DL SA in order to assist the UE in determining there is a HARQ-ACK payload it should convey in a PUCCH. As the NodeB cannot predict whether there will be a DL SA for a given UE in future DL subframes, the $V_{DAI}^{DL}$ is a relative counter which is incremented in each DL SA transmitted to a UE and starts from the beginning after the DL subframe is linked to the UL subframe of the HARQ-ACK signal transmission. Then, if the last DL SA is missed by the UE, the incorrect HARQ-ACK payload is transmitted which may cause incorrect understanding of at least some of the HARQ-ACK bits at the NodeB. In all following descriptions, the DL DAI IE is assumed to consist of 2 bits with the values of "00", "01", "10", "11" respectively indicating $V_{DAI}^{DL}=1$, $V_{DAI}^{DL}=2$, $V_{DAI}^{DL}=3$, and $V_{DAI}^{DL}=4$.

FIG. 8 illustrates a setting for a DL DAI IE according to the related art.

Referring to FIG. 8, a bundling window consists of 4 DL subframes. In a DL subframe 0 810, the NodeB transmits a DL SA to a UE and sets the DL DAI IE value to $V_{DAI}^{DL}=1$. In DL subframe 1 820, the NodeB transmits a DL SA to the UE and sets the DL DAI IE value to $V_{DAI}^{DL}=2$. In DL subframe 2 830, the NodeB does not transmit a DL SA to the UE, and thus, there is no DL DAI IE value. In DL subframe 3 840, the NodeB transmits PDSCH to the UE and sets the DL DAI IE value to $V_{DAI}^{DL}=3$. If the UE misses the DL SA in the last subframe, it cannot know this event and an erroneous operation occurs as the UE cannot report a respective DTX or NACK.

If a UE does not detect a DL SA transmitted by the NodeB in a subframe other than the last one in a bundling window and detects a DL SA transmitted in a subsequent subframe in the same bundling window, it can infer from the DL DAI IE value of the latter DL SA the number of previous DL SAs it has missed. The total number of DL SAs a UE detects in a bundling window is denoted by $U_{DAI}$. Therefore, a UE can know that it missed $V_{DAI, last}^{DL} - U_{DAI}$ DL SAs where $V_{DAI, last}^{DL}$ is the DL DAI IE value in the last DL SA that the UE detects in a bundling window. The actual number of DL SAs the UE may actually miss can be larger than $V_{DAI, last}^{DL} - U_{DAI}$. This happens if the UE misses DL SAs after the last DL SA that it detects.

If a UE has a PUSCH transmission in an UL subframe where it also transmits HARQ-ACK information, the UE may transmit the HARQ-ACK information in the PUSCH. In order to avoid error cases where the UE has missed the last DL SA and in order to ensure the same understanding between the NodeB and the UE for the HARQ-ACK payload the UE transmits in the PUSCH, a DAI IE is also included in the UL SA so that there is an UL DAI IE to indicate the HARQ-ACK payload. If the PUSCH transmission is not associated with a UL SA, a UE assumes that there is a DL SA in every DL subframe in the bundling window.

As for the DL DAI IE, the UL DAI IE value $V_{DAI}^{UL}$ is also assumed to be represented by 2 bits with the values of "00", "01", "10", "11" respectively indicating $V_{DAI}^{UL}=1$, $V_{DAI}^{UL}=2$, $V_{DAI}^{UL}=3$, and $V_{DAI}^{UL}=4$ or 0. The UL DAI IE bits "11" map to $V_{DAI}^{UL}=4$ if the UE detects at least one DL SA in the bundling window; otherwise, they map to $V_{DAI}^{UL}=0$. In a case where the bundling window is larger than 4 subframes, the UL DAI IE value of "00" is assumed to indicate $V_{DAI}^{UL}=5$ if $1<U_{DAI}\leq5$ or $V_{DAI}^{UL}=9$ if $U_{DAI}>5$. Similar, the UL DAI IE value of "01" is assumed to indicate $V_{DAI}^{UL}=6$ if $2<U_{DAI}\leq6$, the UL DAI IE value of "10" is assumed to indicate $V_{DAI}^{UL}=7$ if $3<U_{DAI}\leq7$, and the UL DAI IE value of "11" is assumed to indicate $V_{DAI}^{UL}=8$ if $4<U_{DAI}\leq8$.

In order to increase peak data rates, the NodeB can configure a UE with Carrier Aggregation (CA) of multiple cells to provide higher operating BWs. For example, in order to support communication over 60 MHz to a UE, a CA of three cells of 20 MHz each can be used. Assuming that the PDSCH in each cell conveys different TBs, the UE generates separate HARQ-ACK information for the respective TBs it receives in each cell. This is similar to single-cell TDD operations, where the UE generates separate HARQ-ACK information for the respective TBs it receives in each DL subframe for which the HARQ-ACK transmission is in the same UL subframe.

The NodeB, using higher layer signaling, can configure a set of C cells to a UE and activate a subset of A cells (A C) for PDSCH reception in a subframe, using for example Medium Access Control (MAC) signaling, however a UE may not transmit or receive in inactive cells. If a PDSCH activating or deactivating configured cells is missed, the UE and the NodeB may have a different understanding of the active cells. Moreover, in order to maintain communication, one cell with a DL/UL pair always remains active and is referred to as a Primary cell (Pcell). PUCCH transmissions from a UE are assumed to be only in its Pcell and HARQ-ACK information is conveyed only in a single PUSCH.

FIG. 9 illustrates a parallelization of the DL DAI IE design in FIG. 8 for operation with multiple DL cells according to the related art.

Referring to FIG. 9, a NodeB transmits DL SAs to a UE in 3 DL subframes in Cell 0 910 and sets the respective DL DAI IE values according to the number of DL SAs transmitted to the UE only for PDSCH transmissions in Cell 0 910. In a similar manner, the NodeB transmits DL SAs to the UE in 2 DL subframes in Cell 1 920 and 2 DL subframes in Cell 2 930 and sets the DL DAI IE values according to the number of DL SAs transmitted to the UE only for PDSCH transmissions in Cell 1 920 and Cell 2 930, respectively.

Alternate designs to the parallelization of the DL DAI design for PDSCH transmission in a single DL cell to multiple DL cells can be based on a joint DL DAI design across DL cells and DL subframes. For each DL subframe in the bundling window, the DL DAI counter operates first in the cell-domain before continuing to the next DL subframe in the bundling window.

FIG. 10 illustrates an operation of a joint DL DAI design across cells and DL subframes according to the related art.

Referring to FIG. 10, DL DAI IE values are shown only for DL subframes and configured DL cells where the NodeB transmits a DL SA to a UE. The DL DAI counter starts from DL subframe 0 in Cell 0 1010 and continues in the cell-domain DL subframe 0 for Cell 1 1020 and Cell 2 1030. After all DL SAs across the DL cells in DL subframe 0 are counted, the DL DAI counter continues sequentially for the remaining DL subframes in the bundling window in the same manner as used for the DL subframe 0. This DL DAI IE is also assumed to consist of 2 bits mapping to the values of $V_{DAI}^{DL}=1, 2, 3, 0$. After $V_{DAI}^{DL}=3$, the next value is $V_{DAI}^{DL}=0$ because $V_{DAI}^{DL}$, is computed modulo 4.

For a UE is configured for communication over multiple DL cells, the fundamental conditions to properly convey HARQ-ACK information to the NodeB remain the same as for single-cell communication. In other words, for transmission of an HARQ-ACK payload of $O_{HARQ-ACK}$ bits encoded with a $(32, O_{HARQ-ACK})$ RM code in a PUSCH, the UE and the NodeB should have the same understanding of $O_{HARQ-ACK}$. As the PUSCH transmission power is determined by assuming a data transmission and as the transmission powers of HARQ-ACK REs and data REs are the same, the HARQ-ACK reception reliability depends on the number of respective PUSCH REs which scales linearly with $O_{HARQ-ACK}$ as indicated in Equation (1). Therefore, whenever possible, $O_{HARQ-ACK}$ should not be a maximum value in order to avoid unnecessarily consuming PUSCH REs.

For HARQ-ACK transmission in a PUCCH, since a UE may miss some DL SAs, a common understanding for the HARQ-ACK payload between the UE and the NodeB is achieved only if the HARQ-ACK payload is always the maximum value of $O_{HARQ-ACK}^{max}=N_{bundle}\cdot(C+C_2)$ bits or, with spatial-domain bundling, $O_{HARQ-ACK}^{max, \ bundle}=N_{bundle}\cdot C$ bits, where $N_{bundle}$ is the size of the bundling window, c is the number of DL cells configured to the UE, and $C_2$ is the number of configured DL cells where the UE is configured a PDSCH Transmission Mode (TM) conveying 2 TBs.

Using the maximum HARQ-ACK payload in a PUCCH does not create additional resource overhead. The UE may transmit a NACK or a DTX (in a case of tri-state HARQ-ACK information) for the TBs it did not receive, however, the NodeB already knows of the DL cells with no DL SA or PDSCH transmission to the UE and can use the knowledge that the UE transmits a NACK for each of those DL cells (a priori information) to improve the HARQ-ACK reception reliability. This is possible because a linear block code and QPSK are assumed to be used for the encoding and modulation of the HARQ-ACK bits, respectively, and the NodeB can consider as candidate HARQ-ACK codewords only the ones having a NACK (binary '0') at the predetermined locations corresponding to cells without DL SA transmissions to the UE. Due to the implementation of the decoding process, the use of the a priori information would be impractical or impossible if a convolutional code or a turbo code was used for the encoding or if QAM was used for the modulation of the HARQ-ACK bits.

Although using the maximum HARQ-ACK payload for transmission in a PUCCH does not generate additional resource overhead, it often results in a larger transmission power than necessary for achieving the desired reception reliability. PUCCH transmissions with larger power than necessary increase UE power consumption and create additional interference degrading the reception reliability of signals transmitted by UEs in the same BW in other cells.

The PUCCH transmission power $P_{PUCCH}(i)$ in UL subframe i is assumed to be given as shown in equation (3), which is in units of decibels (dBs) per milliwatt (dBm).

$$P_{PUCCH}(i) = \min\{P_{CMAX,c}, h(n_{HARQ-ACK}(i)) + F(i)\} \quad \text{Equation (3)}$$

where $P_{CMAX,c}$ is the maximum allowed UE transmission power in its Pcell, $h(n_{HARQ-ACK}(i))$ is a monotonically increasing function of the $n_{HARQ-ACK}(i)$ HARQ-ACK information bits the UE assumes it is transmitting, and $F(i)$ is a general function capturing all other parameters affecting $P_{PUCCH}(i)$ in UL subframe i. However, the present invention is not limited to the exact expression of $h(n_{HARQ-ACK}(i))$, for example, it may be determined as $h(n_{HARQ-ACK}(i)) = \alpha \cdot 10 \log 10(n_{HARQ-ACK}(i))$, with $\alpha$ being a positive number, or $h(n_{HARQ-ACK}(i))$ can be provided by a table indicating the transmission power as function of $n_{HARQ-ACK}(i)$. It is noted that the above expression does not account for possible multiplexing with the HARQ-ACK of additional information, such as a Service Request Indicator (SRI) used by a UE to indicate it has data to transmit. The key issue is for a UE to determine the proper $n_{HARQ-ACK}$ value. If $n_{HARQ-ACK}$ is too small the HARQ-ACK reception reliability is degraded. If $n_{HARQ-ACK}$ is too large, interference and UE battery consumption increase unnecessarily.

One possibility is for $n_{HARQ-ACK}(i)$ to be equal to the number of TBs the UE receives in a respective bundling window. This avoids excessive transmission power, but may underestimate the required transmission power as some DL SAs may be missed, thereby decreasing the HARQ-ACK reception reliability. Another possibility is to derive $n_{HARQ-ACK}(i)$ from the maximum HARQ-ACK payload as $n_{HARQ-ACQ}(i) = N_{bundle} \cdot (C+C_2)$. This ensures that the required HARQ-ACK reception reliability is always met, but will often result to the transmission power being excessively large. A variation of the second possibility is to consider only the number of activated cells A and the configured TM in each such cell. Then, $n_{HARQ-ACQ}(i) = N_{bundle} \cdot (A+A_2)$ where $A_2$ is the number of activated cells with a configured TM conveying 2 TBs. However, excessive transmission power is again not avoided as not all active cells may transmit PDSCH to the UE in every DL subframe in the bundling window.

Therefore, there is a need to set the HARQ-ACK transmission power in a PUCCH while achieving the desired HARQ-ACK reception reliability in case of DL CA for a TDD system.

There is also a need to set the HARQ-ACK transmission power in the PUCCH while minimizing interference and UE power consumption in case of DL CA for a TDD system.

There is also a need to establish a common understanding between the UE and the NodeB about the correspondence between the HARQ-ACK information bits in the transmitted codeword and the respective cells and subframes in the case of a DL CA for a TDD system.

Finally, there is also a need to minimize the number of PUSCH REs allocated to HARQ-ACK transmission in case of DL CA for a TDD system.

SUMMARY OF THE INVENTION

Aspects of the present invention are to address at least the above-mentioned problems and/or disadvantages and to provide at least the advantages described below. Accordingly, an aspect of the present invention is to provide methods and apparatus for a UE operating in a TDD communication system and configured to have multiple DL cells to determine the HARQ-ACK payload for transmission in a PUSCH and the HARQ-ACK signal transmission power for transmission in a PUCCH while considering the presence and design of a DAI IE in DCI formats scheduling PDSCH receptions by the UE and the presence and design of a DAI IE in DCI formats scheduling PUSCH transmissions by the UE.

In accordance with an aspect of the present invention, a UE determines the transmission power of HARQ-ACK signal transmission in a PUCCH by determining a parameter that is the sum of two components. The first component is equal to a number of TBs received through all configured DL cells and through all DL subframes in the bundling window and does not depend on the transmission mode that the UE is configured to have for PUSCH reception in a respective DL cell. The second component is equal to a number of TBs that the UE did not receive but which it can identify as missed. The UE, using the DL DAI IE values in the DL SAs that it detects, can determine a number of PDSCH that the UE missed in each configured DL cell, although the UE may not necessarily determine all PDSCH that it missed. Then, depending on the respective configured PDSCH transmission mode in each configured DL cell, the UE identifies that it missed PDSCH, and thus, the UE computes a number of TBs assuming that each missed PDSCH conveyed a number of TBs determined by the respective configured transmission mode.

In accordance with another aspect of the present invention, a UE determines the HARQ-ACK payload for multiplexing in a PUSCH depending on whether the PUSCH is scheduled by an UL SA. If the PUSCH is not scheduled by an UL SA, the UE multiplexes the maximum HARQ-ACK payload, which is equal to the sum of the number of configured DL cells and the number of configured DL cells, with a configured PDSCH transmission mode that enables the transmission of 2 TBs multiplied by a size of the bundling window. If the PUSCH is scheduled by an UL SA, the UE considers that the UL DAI IE value of the UL SA is applicable over all configured DL cells and indicates the number of PDSCH transmitted to the UE in each of the configured DL cells. Then, for each of the configured DL cells, the HARQ-ACK payload that the UE generates is equal to the number of TBs associated with the respective configured transmission mode for the PDSCH multiplied by the size of the bundling window.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS

Figure 1:
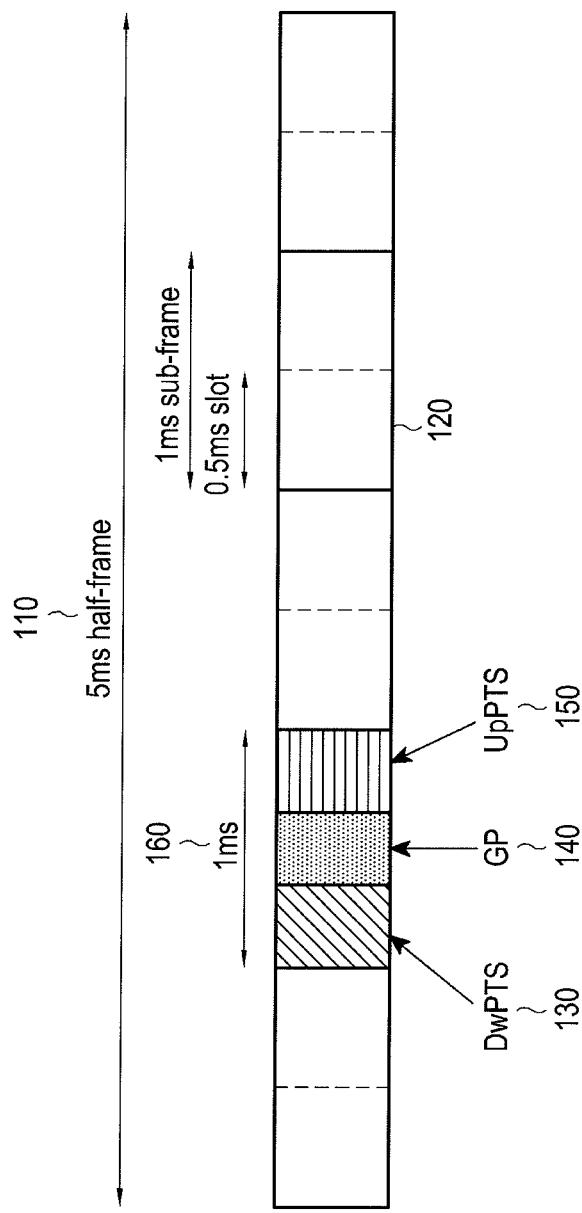
FIG. 1 is a diagram illustrating a frame structure for a TDD system according to the related art.
Figure 2:
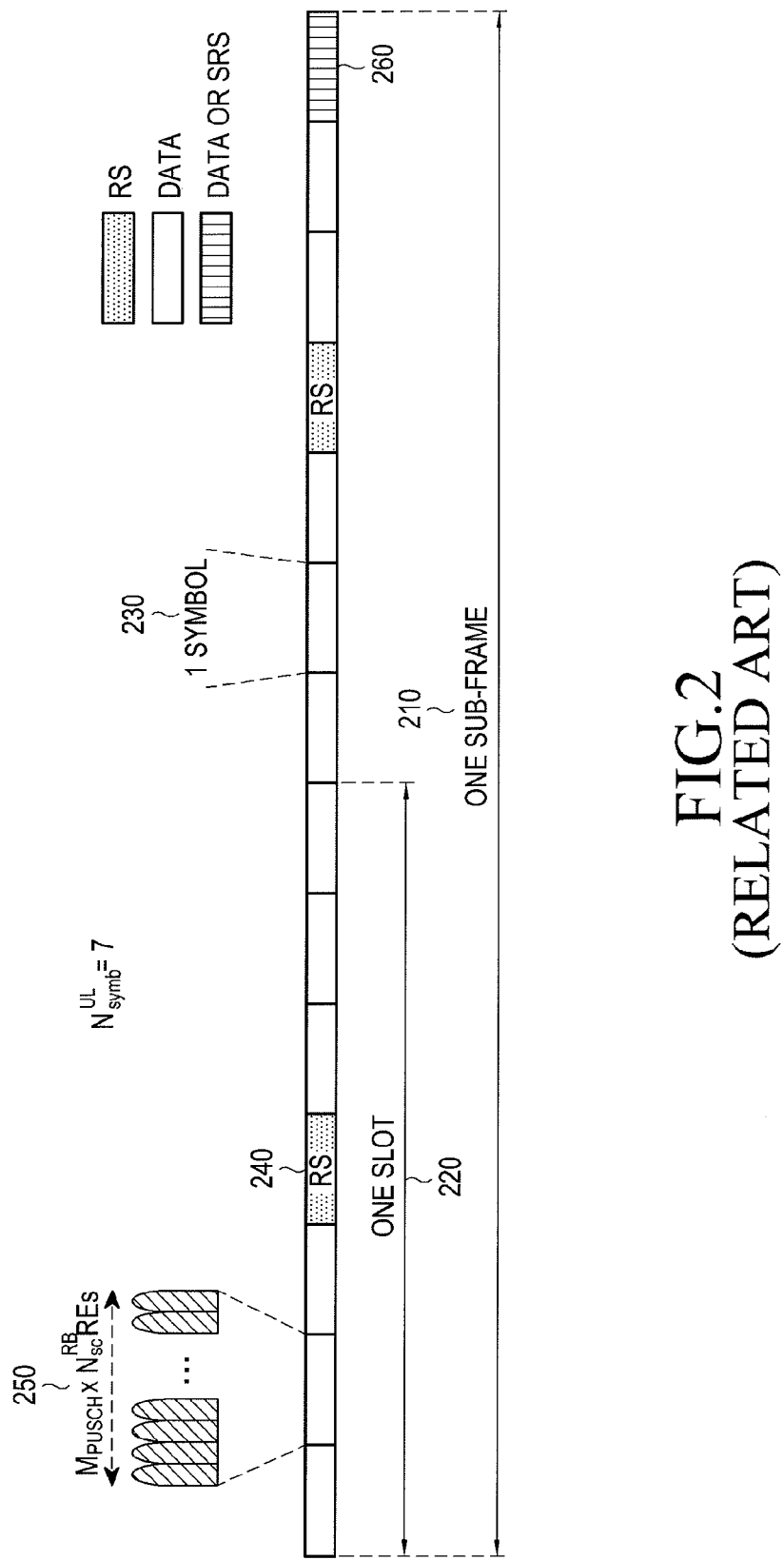
FIG. 2 is a diagram illustrating a PUSCH transmission structure according to the related art.
Figure 3:
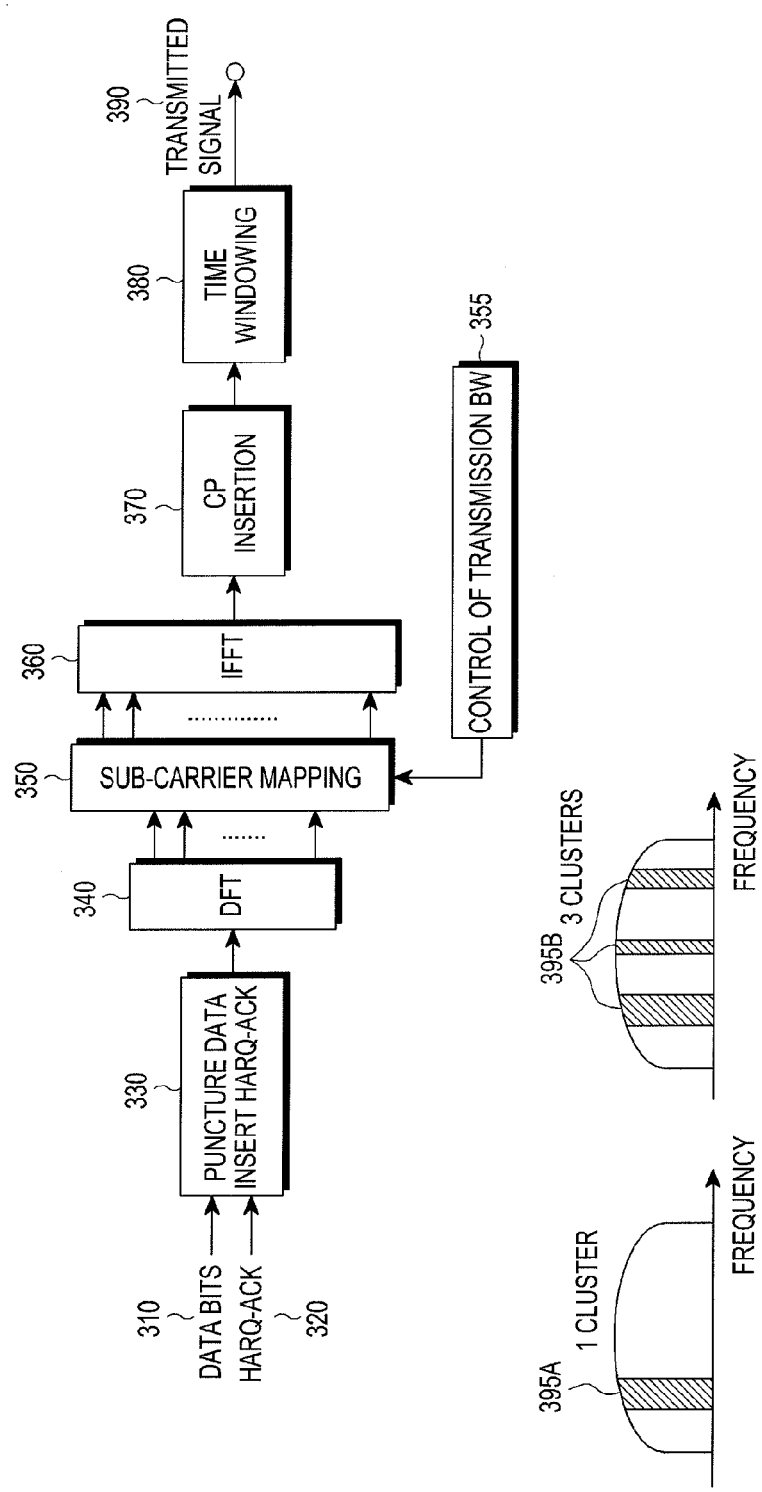
FIG. 3 is a block diagram illustrating a transmitter for transmitting data information and HARQ-ACK information in a PUSCH according to the related art.
Figure 4:
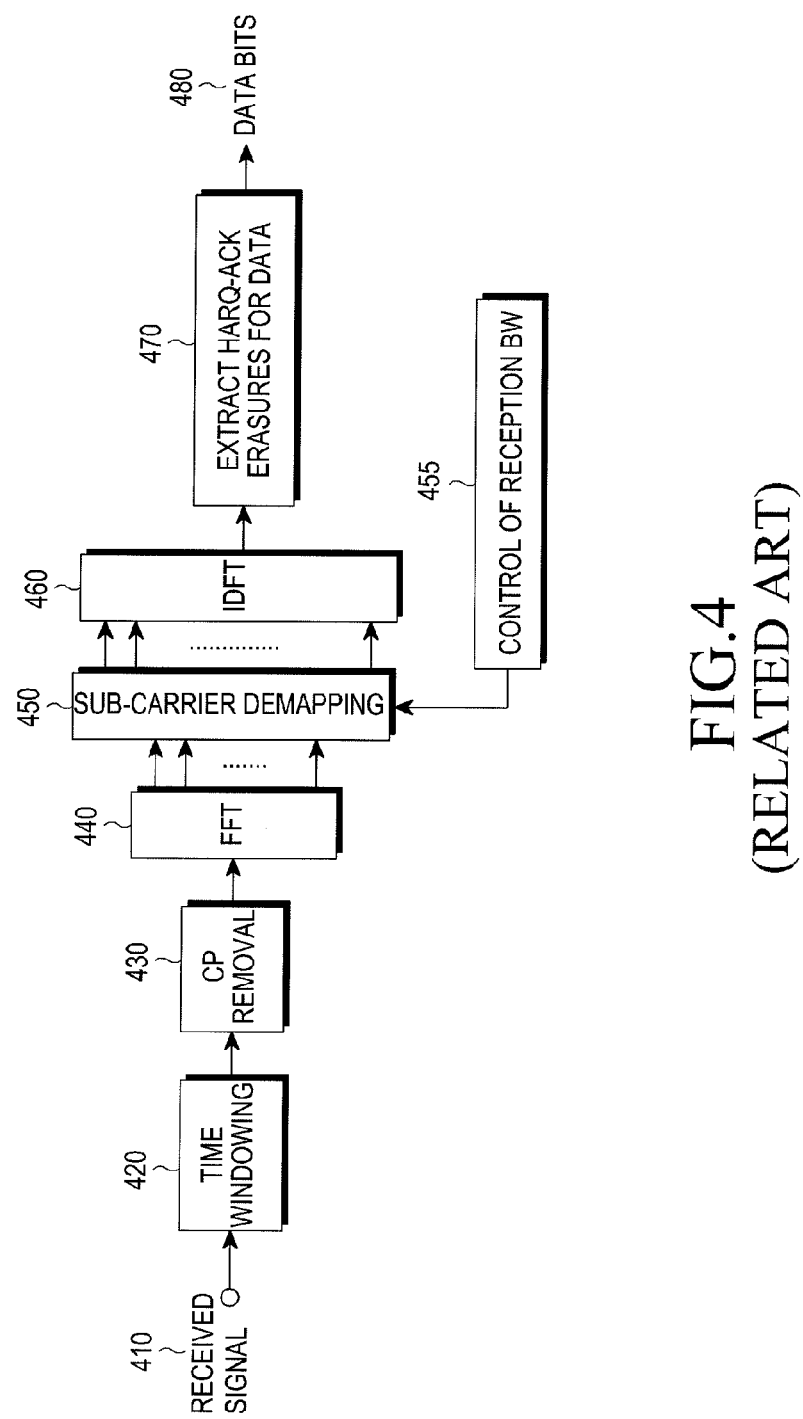
FIG. 4 is a block diagram illustrating a receiver for receiving data information and HARQ-ACK information in a PUSCH according to the related art.
Figure 5:
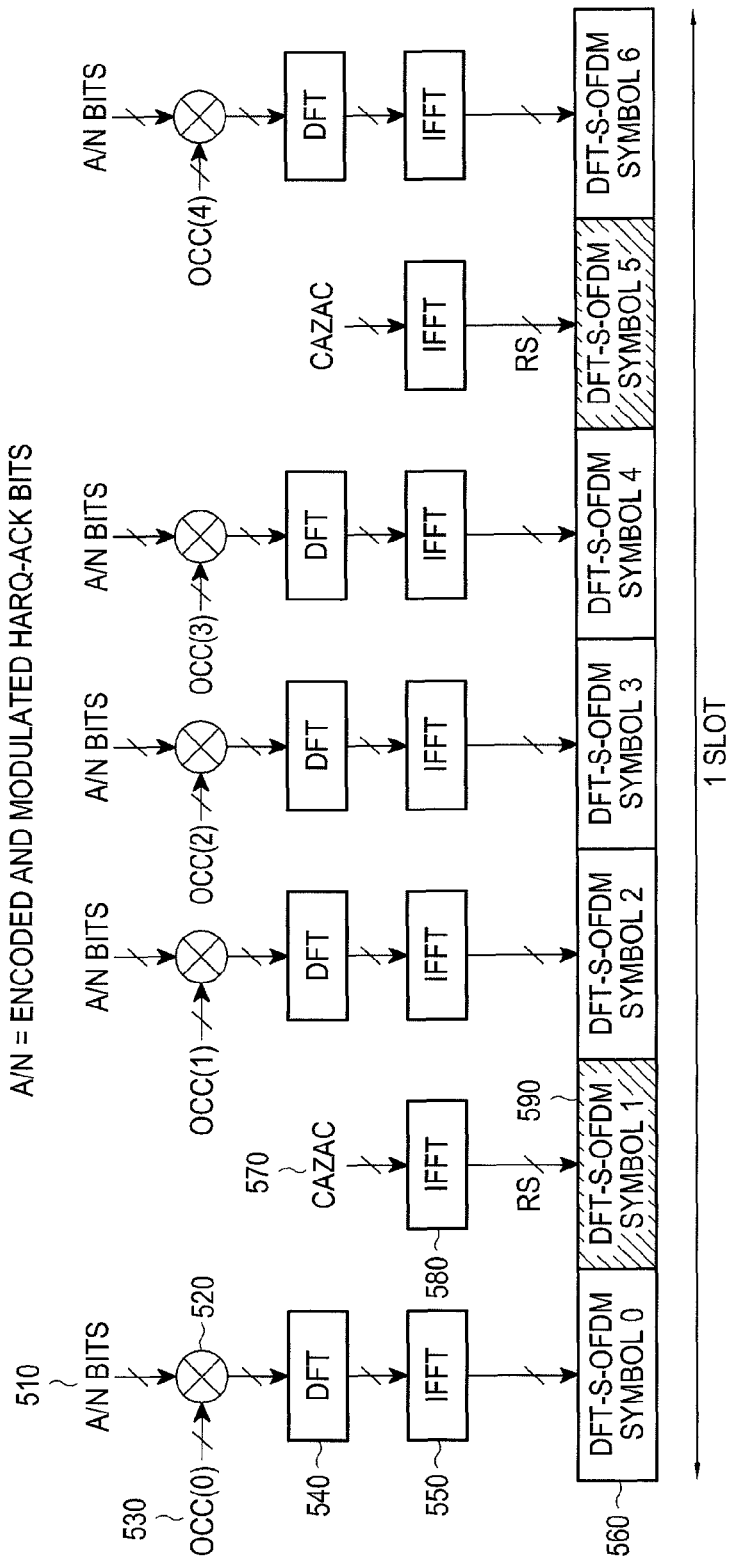
FIG. 5 is a diagram illustrating a PUCCH structure for the transmission of multiple HARQ-ACK information bits using the DFT-S-OFDM transmission method according to the related art.
Figure 6:
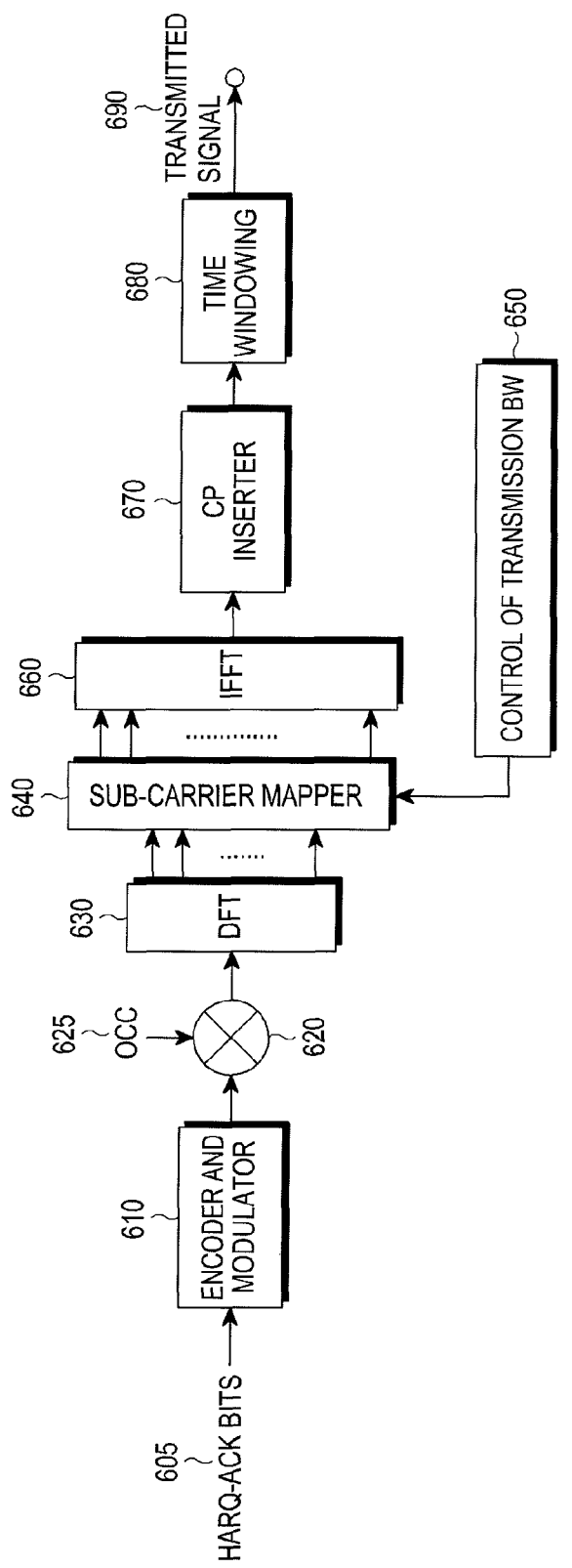
FIG. 6 is a block diagram illustrating a transmitter for transmitting HARQ-ACK information in a PUCCH according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Additionally, although exemplary embodiments of the present invention will be described below with reference to Discrete Fourier Transform (DFT)-spread Orthogonal Frequency Division Multiplexing (OFDM) transmission, the exemplary embodiments of the present invention are also applicable to all Frequency Division Multiplexing (FDM) transmissions in general and to Single-Carrier Frequency Division Multiple Access (SC-FDMA) and OFDM in particular.

In all subsequent descriptions, a User Equipment (UE) is assumed to generate Hybrid Automatic Repeat reQuest (HARQ)-ACKnowledgement (ACK) information in response to each Transmission Block (TB) associated with a DownLink (DL) Scheduling Assignment (SA). However, a UE may also deterministically generate HARQ-ACK information associated with each Semi-Persistent Scheduling (SPS) TB the NodeB transmits at predetermined DL subframes without transmitting a respective DL SA. In the remaining TBs, it is understood that the UE includes HARQ-ACK information due to SPS, when it exists, with the HARQ-ACK information it generates in response to DL SAs and a placement of the HARQ-ACK information can be, for example, in the beginning of the overall HARQ-ACK payload. Further explicit reference to HARQ-ACK information in response to SPS TBs is omitted for brevity. Moreover, in the case of a DL SA not being associated with a respective PDSCH (and data TBs), but instead being used to serve other purposes, will also not be explicitly considered. However, a UE is assumed to generate a HARQ-ACK information bit corresponding to such DL SA. The descriptions of the exemplary embodiments consider the configured cells but the same arguments directly apply if the activated cells are instead considered.

An exemplary embodiment of the present invention describes a method for a UE to determine the transmission power of its HARQ-ACK signal in a Physical Uplink Control Channel (PUCCH) for a Time-Division Duplex (TDD) system using DL Carrier Aggregation (CA). The UE is to determine the parameter $n_{HARQ-ACK}(i)$ used in the Transmit Power Control (TPC) formula in Equation (3) (for simplicity, an UpLink (UL) subframe index i is omitted in the following analysis).

The first step for determining $n_{HARQ-ACK}$ is to determine a first component consisting of the number of HARQ-ACK information bits derived from the received TBs in the DL subframe bundling window, $n_{HARQ-ACK}^{rTBs}$, without considering the respective configured Physical Downlink Shared CHannel (PDSCH) Transmission Mode (TM). Consequently, even though a UE may be configured to be in a Single User-Multiple Input Multiple Output (SU-MIMO) TM enabling transmission of 2 TBs in a PDSCH from the NodeB to the UE in a cell, the transmission power accounts for 1 HARQ-ACK bit if the PDSCH reception actually conveys only 1 $TB_{max}$. Therefore, the PUCCH transmission power does not depend on the configured PDSCH TM for each cell but depends on the number of received TBs in that cell. Denoting as R the total number of received TBs in the configured cells over a bundling window of $N_{bundle}$ DL subframes, $$N^{received} = \sum_{c=0}^{C-1} \sum_{m=0}^{N_{bundle}-1} N^{received}(m, c)$$

where $N^{received}(m,c)$ is the number of received TBs in configured cell c in DL subframe m of the bundling window, the total number of HARQ-ACK bits corresponding to received TBs is rTBs received $$n_{HARQ-ACK}{}^{rTBs} = N^{received} \quad \text{Equation (4)}$$

The second step in determining the value of $n_{HARQ-ACK}$ is to determine, based on the DL DAI IE, a second component consisting of HARQ-ACK bits corresponding to TBs that were not received, but which can be inferred by a UE as being transmitted by the NodeB using the DL DAI IE in order to determine the PDSCH receptions that the UE has missed. As the UE may not know the number of TBs conveyed by a missed PDSCH reception (i.e., 1 TB or 2 TBs were conveyed), the respective number of HARQ-ACK bits considers the configured PDSCH TM in the respective cell of the missed DL SA that the UE identified in order to provide a conservative estimate and always ensure that the HARQ-ACK reception reliability is achieved in a case where the configured PDSCH TM enabled transmission of the 2 TBs to the UE. Therefore, if a UE determines that it missed a total of $N_{DLSA}{}^{missed}$ DL SAs where $N_{DLSA,2}{}^{missed}$ of those DL SAs are in DL cells where the UE has a configured PDSCH TM enabling transmission of 2 TBs, the UE determines the number of respective HARQ-ACK bits as $$n_{HARQ-ACK}{}^{mTBs} = N_{DL\,SA}{}^{missed} = N_{DL\,SA,2}{}^{missed} \quad \text{Equation (5)}$$

Then, $n_{HARQ-ACK}$ is obtained as $$n_{HARQ-ACK} = n_{HARQ-ACK}{}^{rTBs} + n_{HARQ-ACK}{}^{mTBs} = N^{received} + N_{DLSA}{}^{missed} + N_{DLSA,2}{}^{missed} \quad \text{Equation (6)}$$

If spatial bundling applies, then $$n_{HARQ-ACK} = N_{DL\,SA}{}^{received} + N_{DL\,SA}{}^{missed} \quad \text{Equation (7)}$$

where $N_{DLSA}{}^{received}$ is the number of DL SAs detected by the UE. Including SPS PDSCH as previously mentioned, $n_{HARQ-ACK} = N_{DLSA}{}^{missed} + N_{PDSCH}{}^{SPS}$.

Figure 7:
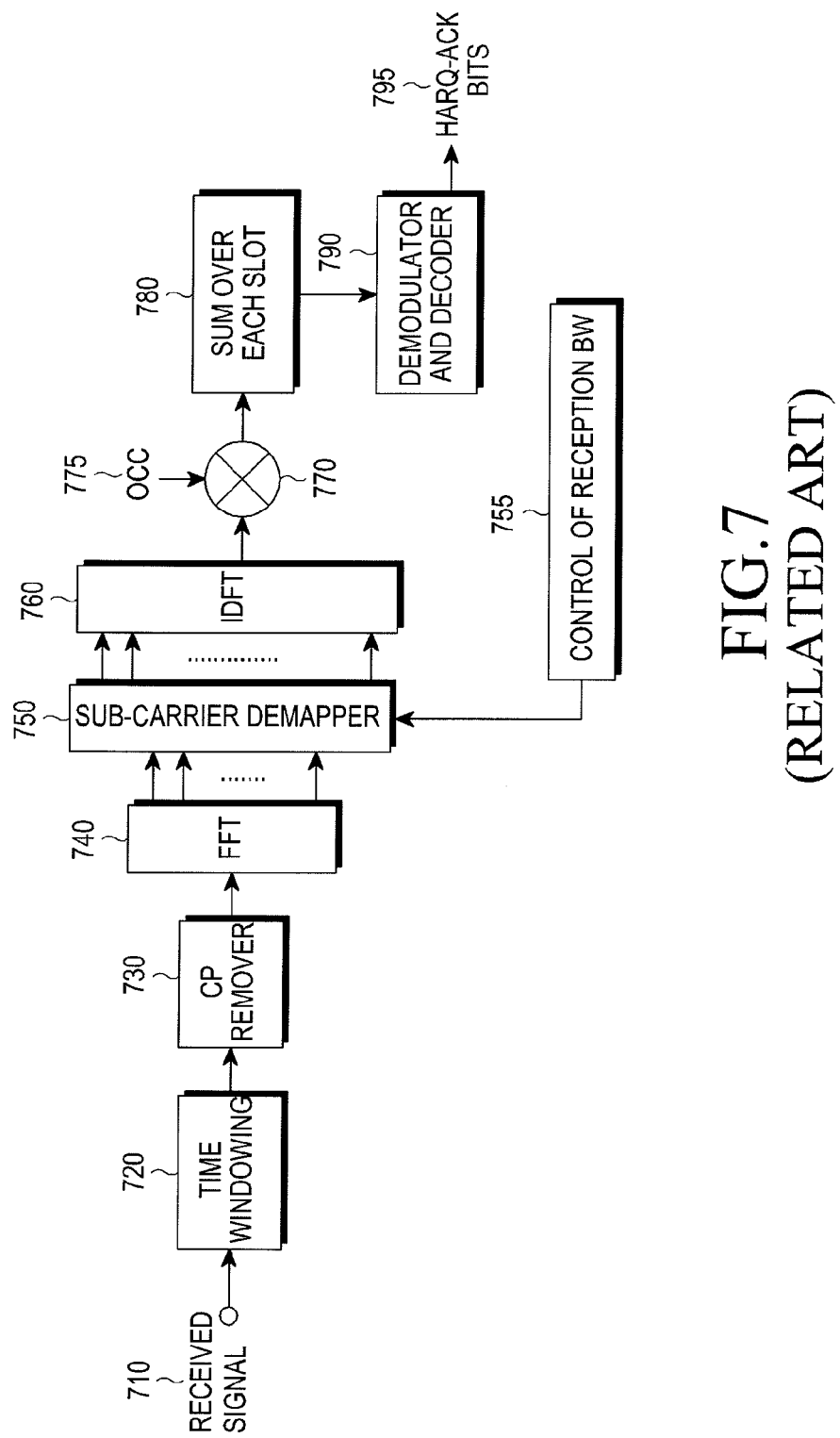
FIG. 7 is a block diagram illustrating a receiver for receiving data HARQ-ACK information in a PUCCH according to the related art.
Figure 8:
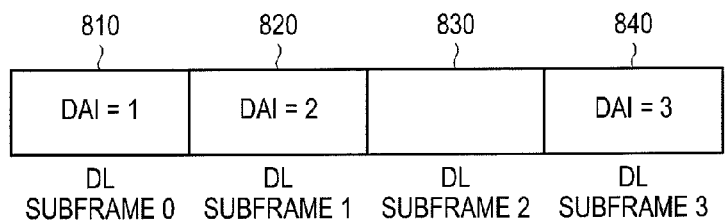
FIG. 8 is a diagram illustrating a setting for a DL DAI IE according to the related art.

For the DL DAI IE design in FIG. 7, $n_{HARQ-ACK}$ can be equivalently obtained as $$n_{HARQ-ACK} = \sum_{c=0}^{C-1} \sum_{m=1}^{V_{DL,last}^{DAI}(c)} TB(m,c) \quad \text{Equation (8)}$$

where $V_{DAI,\,last}^{DL}(c)$ is the DL DAI IE value in the last DL SA that the UE successfully receives in cell c, and TB(m,c) is the number of TBs that the UE receives in cell c and subframe j in the bundling window. For a DL subframe m and cell c where the UE misses the DL SA, TB(m,c) is determined by the maximum number of TBs associated with the configured TM in cell c $TB_{max}(c)$. As the DL DAI IE design in FIG. 7 is a counter of DL SAs transmitted per cell to a UE, Equation (8) is equivalent to $$n_{HARQ-ACK} = \sum_{c=0}^{C-1} \left( (V_{DAI,last}^{DL}(c) - U_{DAI}(c)) \cdot TB_{max}(c) + \sum_{m=0}^{N_{bundle}-1} N^{received}(m,c) \right)$$

where $U_{DAI}(c)$ is the total number of DL SAs the UE detects in cell c during the bundling window. The UE knows it misses $V_{DAI,\,last}^{DL}(c) - U_{DAI}(c)$ DL SAs in cell c. If spatial bundling is applied, TB(m, c)=1 and $$n_{HARQ-ACK} = \sum_{c=0}^{C-1} \left( (V_{DAI,last}^{DL}(c) - U_{DAI}(c)) + \sum_{m=0}^{N_{bundle}-1} N_{DLSA}^{received}(m,c) \right)$$

In a case where the number of TBs does not vary per DL subframe in cell c, or in other words, the number of TBs is always equal to the number of TBs for the configured TM, then $$U_{DAI}(c) \cdot TB_{max}(c) = \sum_{m=0}^{N_{bundle}-1} N^{received}(m,c)$$

and Equation (8) can be simplified as $$n_{HARQ-ACK} = \sum_{c=0}^{C-1} V_{DL,last}^{DAI}(c) \cdot TB(c) \quad \text{Equation (9)}$$

Figure 9:
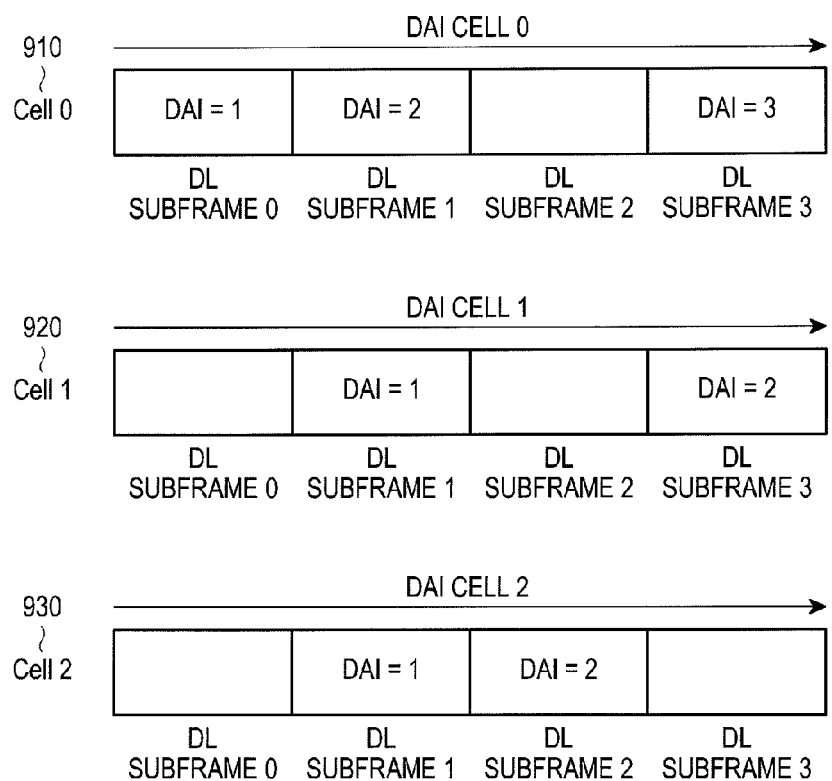
FIG. 9 is a diagram illustrating a parallelization of the DL DAI IE design in FIG. 8 for operation with multiple cells according to the related art.
Figure 11:
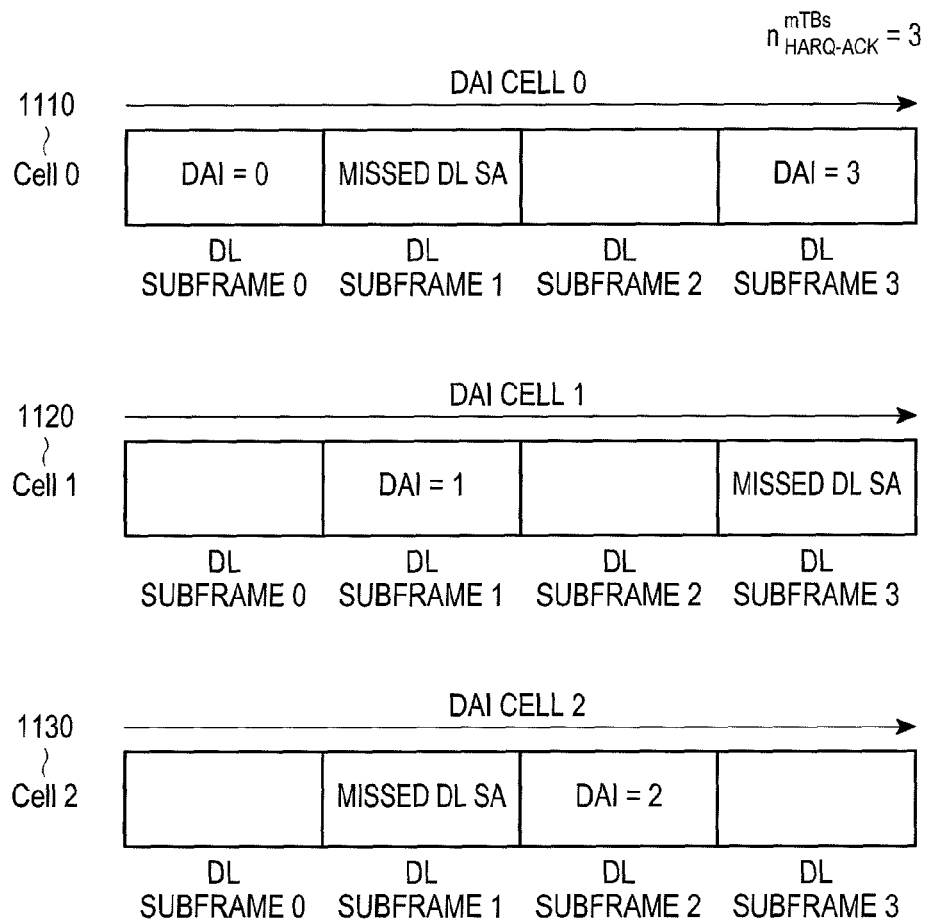
FIG. 11 is a diagram illustrating a process for a UE configured with multiple DL cells to determine missed DL SAs assuming the direct parallelization of the DL DAI design in FIG. 9 to multiple DL cells according to an exemplary embodiment of the present invention.

FIG. 11 illustrates a process for a UE configured with multiple DL cells to determine missed DL SAs assuming the direct parallelization of the DL DAI design in FIG. 9 to multiple DL cells according to an exemplary embodiment of the present invention.

Referring to FIG. 11, for C=3 configured cells and for a bundling window size of $N_{bundle}$=4 subframes, a UE determines the $N_{DLSA}{}^{missed}$ missed DL SAs by counting their number based on the DL DAI IE values in the DL SAs it receives. In Cell 0 1110, the UE misses the DL SA in DL subframe 1 and it becomes aware of this event based on the DL DAI IE value $V_{DAI,\,last}^{DL}(0)$ in DL subframe 3, wherein the DL DAI IE value is $V_{DAI,\,last}^{DL}(0)=3$, and $U_{DAI}(0)=2$. In Cell 1 1120, the UE misses the DL SA in DL subframe 3 but cannot become aware of this event as DL subframe 3 is the last subframe of the bundling window, wherein the DL DAI IE value is $V_{DAI,\,last}^{DL}(1)=1$ and $U_{DAI}(1)=1$. In Cell 2 1130, the UE misses the DL SA in DL subframe 1 and it becomes aware of this event based on the DL DAI IE value $V_{DAI,\,last}^{DL}(2)$ in DL subframe 2, wherein the DL DAI IE value is $V_{DAI,\,last}^{DL}(2)=2$, and $U_{DAI}(2)=1$. Therefore, the UE determines that it missed $N_{DLSA}{}^{missed}=2$ DL SAs, wherein $$N_{DLSA}^{missed} = \sum_{c=0}^{2} (V_{DAI,last}^{DL}(c) - U_{DAI}(c),$$

even though it missed 3 DL SAs and it also determines the respective cells of the 3 missed DL SAs.

Furthermore, if in Cell 0 the UE is configured with a TM enabling transmission of 2 TBs ($TB_{max}(0)=2$) and in Cell 2 the UE is configured with a TM enabling transmission of 1 TB ($TB_{max}(2)=1$) the UE assumes that the total number of missed TBs is 3 (2 TBs in Cell 0 and 1 TB in Cell 2). Therefore, in addition to the received TBs, the UE, for the determination of $n_{HARQ-ACK}$, considers the $$n_{HARQ-ACK}^{mTBs} = N_{DLSA}^{missed} + N_{DLSA,2}^{missed} = 3 = \sum_{c=0}^{2}(V_{DAI,last}^{DL}(c) - U_{DAI}(c)) \cdot TB_{max}(c)$$

TBs the UE identified as missed. In FIG. 11, the UE receives 2 TBs in DL subframe 0 and 2 TBs in DL subframe 3 in Cell 0, 1 TB in DL subframe 3 in Cell 1, and 1 TB in DL subframe 2 of Cell 2. Therefore, the total number of received TBs and the respective number of HARQ-ACK bits is $n_{HARQ-ACK}^{rTBs} = N^{received} = 6$. Therefore $n_{HARQ-ACK} = 9$.

Figure 10:
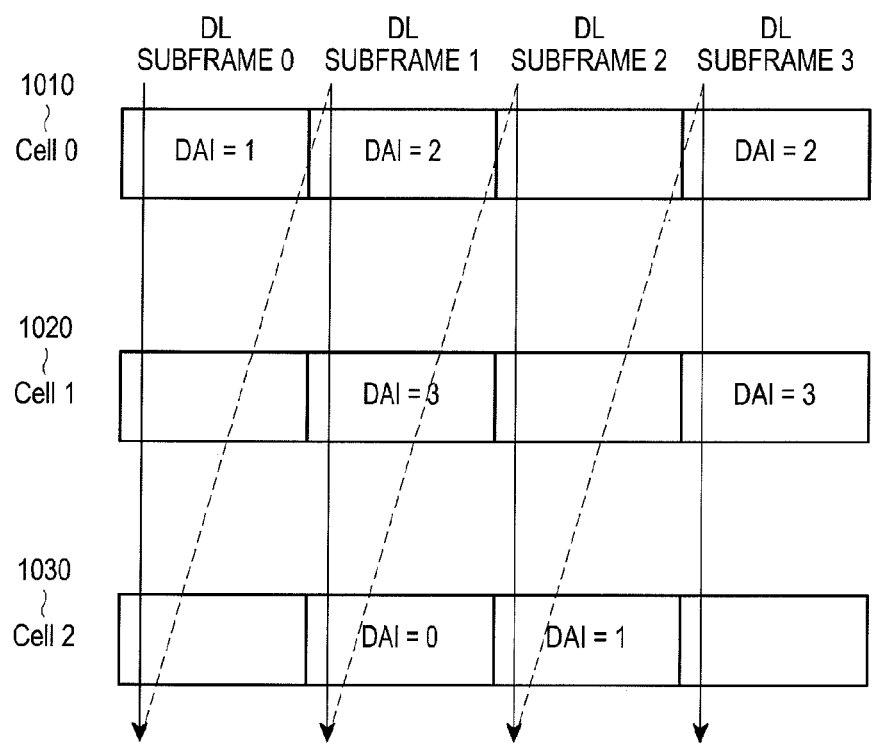
FIG. 10 is a diagram illustrating an operation of a joint DL DAI design across cells and DL subframes according to the related art.

For the DL DAI IE design in FIG. 10, $n_{HARQ-ACK}$ can be equivalently obtained as $$n_{HARQ-ACK} = N^{received} + N_{DLSA}^{missed} \cdot TB_{max} \qquad \text{Equation (10)}$$

where $TB_{max}$ is the maximum number of TBs the UE is enabled to receive from the configured TM in any of the cells. If spatial bundling applies, then $TB_{max} = 1$. Therefore, $N_{DLSA,2}^{missed} = N_{DLSA}^{missed}$ if $TB_{max} = 2$ and $N_{DLSA,2}^{missed} = 0$ if TB=1. If, due to the modulo operation, the UE identifies that the DL DAI is reset $N_{reset}$ times, then $n_{HARQ-ACK} = N^{received} + (N_{reset} \cdot N_{bundle} + V_{DAI, last}^{DL} - U_{DAI}) \cdot TB_{max}$ where $V_{DAI, last}^{DL}$ is the last DL DAI IE value for the design in FIG. 10 and $U_{DAI}$ is the number of DL SAs the UE detected across all cells and DL subframes in the bundling window of size $N_{bundle}$. If spatial bundling is used, then $N^{received} = U_{DAI}$ and $n_{HARQ-ACK} = N^{reset} \cdot N_{bundle} + V_{DAI, last}^{DL}$.

Figure 12:
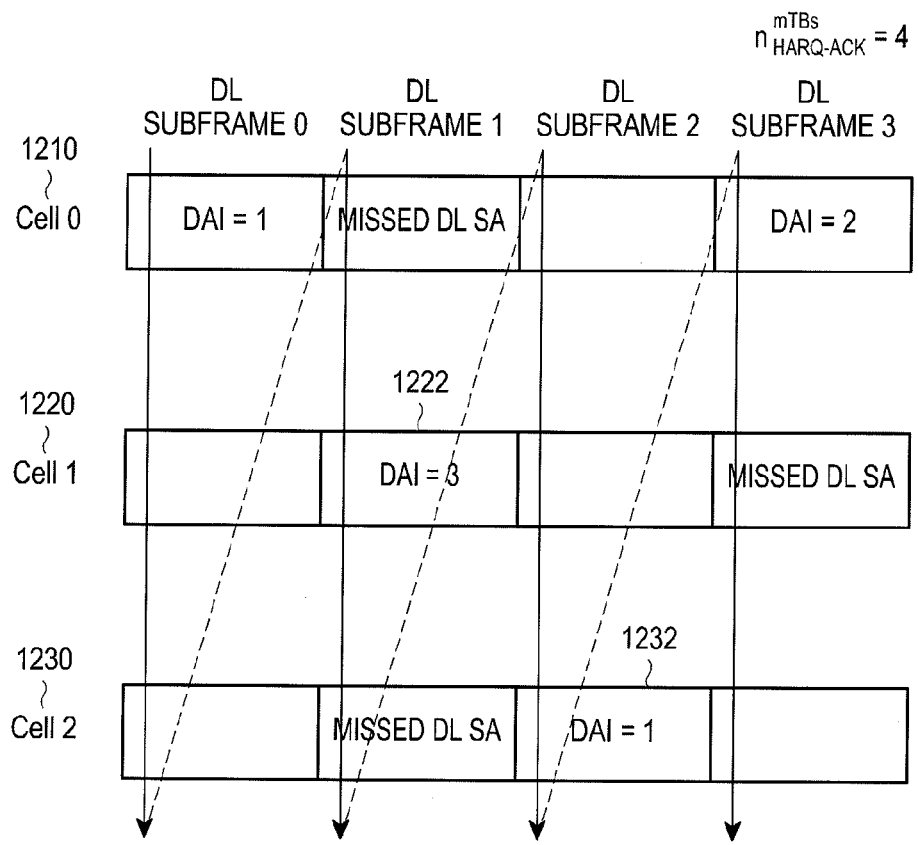
FIG. 12 is a diagram illustrating a process for a UE configured with multiple DL cells to determine missed DL SAs for the DL DAI operation in multiple DL cells as in FIG. 10 according to an exemplary embodiment of the present invention.

FIG. 12 illustrates a process for a UE configured with multiple DL cells to determine missed DL SAs for the DL DAI operation in multiple DL cells as in FIG. 10 according to an exemplary embodiment of the present invention.

Referring to FIG. 12, in Cell 0 1210, the UE misses the DL SA in DL subframe 1 and it becomes aware of a missed DL SA (although, the UE does not necessarily become aware of the actual missed DL SA) based on the DL DAI IE value in DL subframe 1 1222 of Cell 1 1220. In Cell 2 1230, the UE misses the DL SA in DL subframe 1 and becomes aware a missed DL SA (again, not necessarily of the actual missed one) based on the DL DAI IE value in DL subframe 2 1232 of Cell 2. Finally, in Cell 1, the UE misses the DL SA in DL subframe 3 but it cannot become aware of this event since it is the last DL SA the NodeB transmits to the UE.

For the DL DAI IE design in FIG. 10, although the UE can identify the missed DL SAs, except for the last one, it may not be able to determine the respective cells. Therefore, the UE may not be able to know the number of TBs it missed and, if spatial bundling is not used, it may not be able to know the respective number of HARQ-ACK bits or the value of $n_{HARQ-ACK}$.

For example, in FIG. 12, the UE cannot know whether the DL SA that was missed in DL subframe 1 of Cell 0 was not transmitted in DL subframe 0 of Cell 1 or Cell 2. As in Cell 0, Cell 1, and Cell 2, the UE has configured TMs enabling transmission for a maximum of 2 TBs, 1 TB, and 1 TB, respectively, and the UE needs to assume that it missed the DL SA in Cell 0 in order to avoid underestimating the HARQ-ACK signal transmission power in the PUCCH. Then, as the UE assumes it missed 2 TBs $N_{DLSA,2}^{missed} = N_{DLSA}^{missed} = 2$, the UE considers that the total number of missed TBs is 4. Therefore, the UE additionally considers $n_{HARQ-ACK}^{mTBs} = N_{DLSA}^{missed} + N_{DLSA,2}^{missed} = 4$ TBs (HARQ-ACK bits) in the determination of $n_{HARQ-ACK}$ and the HARQ-ACK signal transmission power in the PUCCH. The remaining TBs (i.e., the HARQ-ACK bits) used to determine $n_{HARQ-ACK}$ and the HARQ-ACK signal transmission power in the PUCCH are based on the received TBs.

In FIG. 12, the UE receives 2 TBs in DL subframe 0 and 2 TBs in DL subframe 3 in Cell 0, 1 TB in DL subframe 3 in Cell 1, and 1 TB in DL subframe 2 of Cell 2 for a total number of $n_{HARQ-ACK}^{rTBs} = N^{received} = 6$ TBs (HARQ-ACK bits). Therefore, $n_{HARQ-ACK} = 10$.

The exemplary embodiments in FIG. 11 and FIG. 12 are only illustrative of two DL DAI designs and are not meant to be exclusive of other designs, but rather the exemplary embodiments are meant to illustrate the use of DL DAI IE in determining the HARQ-ACK payload that the UE assumes when setting the transmission power of the HARQ-ACK signal in the PUCCH. For example, the first component may be based on the number of configured or activated cells instead of the number of received TBs.

Based on the previous analysis, alternative approaches for a UE to decide the number of TBs contained in missed DL SAs can be devised in a straightforward manner. For example, the UE may assume that each missed DL SA conveyed 1 TB, in order to avoid HARQ-ACK signal transmission in the PUCCH with larger power than necessary. Alternatively, the UE may assume that in a case where it has a configured TM enabling the transmission of 2 TBs in any cell, half of the missed PDSCH receptions convey 2 TBs and the other half convey 1 TB (with priority given to 2 TBs in case of an odd number of missed DL SAs). Then, $n_{HARQ-ACK}^{mTBs} = N_{DL\,SA}^{missed} + \lceil N_{DL\,SA,2}^{missed}/2 \rceil$.

In a case where the DL DAI design cannot provide information to the UE about whether a DL SA in the last DL subframe of the bundling window is missed, the UE may assume one or two additional TBs (depending on the configured TM in the respective cell) when determining $n_{HARQ-ACK}^{mTBs}$ if the UE does not receive a DL SA in the last DL subframe of the bundling window. Then, $n_{HARQ-ACK} = n_{HARQ-ACK}^{rTBs} + n_{HARQ-ACK}^{mTBs} + Q_{last}$ where, for example, $Q_{last} = 2$ if the UE has a configured TM enabling the transmission of 2 TBs; otherwise $Q_{last} = 1$. In a case where multiple DL subframes may be missed, then the $Q_{last}$ value may be scaled accordingly. In this manner, the UE does not underestimate the required HARQ-ACK signal transmission power in the PUCCH. The number of DL subframes that should be accounted for by $Q_{last}$ may be predetermined or configured for the UE by the NodeB.

Another exemplary embodiment of the present invention considers the determination of the HARQ-ACK payload in a PUSCH in order for a UE and a NodeB to achieve the same understanding of the transmitted HARQ-ACK information. In all subsequent descriptions, a UE is assumed to generate an ACK or a NACK depending on the reception outcome (correct or incorrect) of each respective TB it receives and to generate a NACK for each TB it identifies as missed. First, a case where no UL SA exists will be discussed below.

As previously noted, for the DL DAI design in FIG. 9, if a UE misses a DL SA in the last DL subframe of the bundling window of each cell, the UE cannot be aware of this event. Therefore, if the HARQ-ACK payload is determined from the number of received TBs, or received DL SAs, this would result in erroneous operation as a UE will not include the respective HARQ-ACK bits in the total HARQ-ACK payload and the NodeB cannot know of the UE missing a DL SA in the last DL subframe. To avoid this erroneous operation, a UE may generate a NACK for each TB (or for multiple TBs in a case of spatial bundling) of each DL subframe in which it did not receive a DL SA. The trade-off for ensuring proper operation in this manner is the increased HARQ-ACK payload as a NACK is generated for each TB of a DL subframe when the NodeB does not transmit a DL SA to the UE. Then, for $N_{bundle}$ DL subframes in the bundling window, the HARQ-ACK payload is $$O_{HARQ-ACK} = N_{bundle} \cdot \sum_{c=0}^{C-1} TB_{max}(c) = N_{bundle} \cdot (C + C_2) \quad \text{Equation (11)}$$

where C is the number of configured cells, $C_2$ is the number of configured cells with a configured TM enabling the reception of 2 TBs for the reference UE, and $TB_{max}(c)$ is the maximum number of TBs the UE is configured to receive in cell c. If spatial bundling is used, then $O_{HARQ-ACK}=N_{bundle} \cdot C$. As a DL DAI IE is not used in this case, the above is applicable to any DL DAI design.

The HARQ-ACK payload in a PUSCH, according to Equation (11), is always the maximum possible value and methods for its possible reduction may be considered.

For the DL DAI design illustrated in FIG. 10, unless spatial bundling is used, the determination of the HARQ-ACK payload is problematic because the DL DAI design in FIG. 10 is across cells where a UE may be configured for TMs enabling reception for different numbers of TBs (1 or 2) and neither the NodeB nor the UE can know which DL SAs were missed. In other words, the UE may have different TMs for different cells, enabling reception for different numbers of TBs in the cells.

Figure 13:
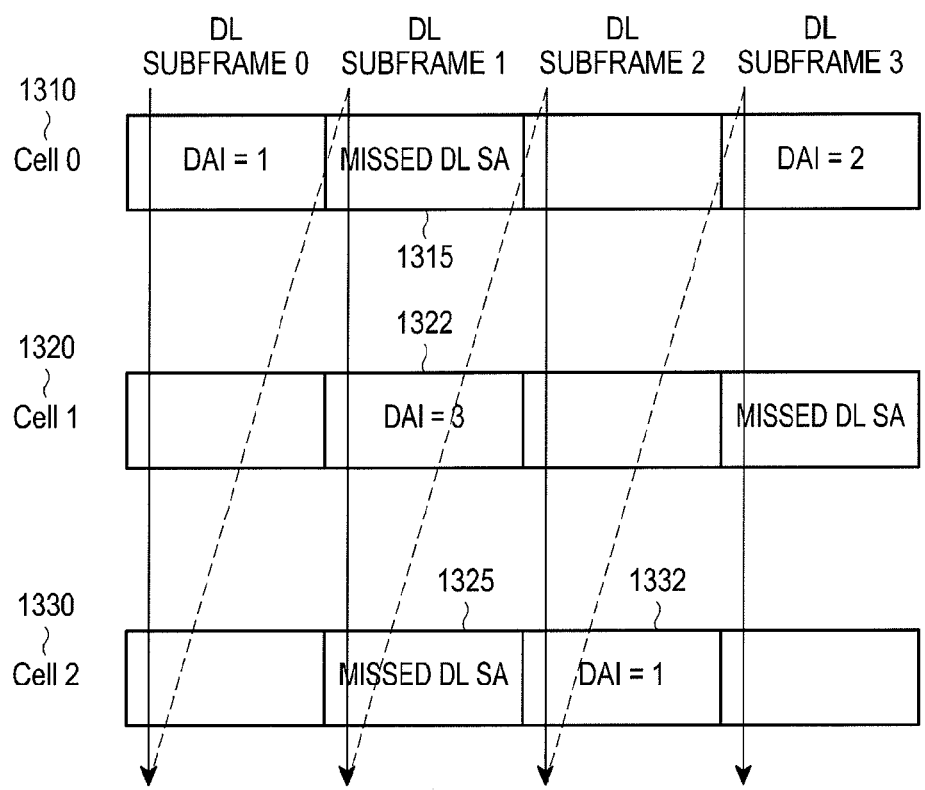
FIG. 13 is a diagram illustrating an example of a UE configured with multiple DL cells not being able to determine which DL SAs it missed in case of the DL DAI design as in FIG. 10 according to an exemplary embodiment of the present invention.

FIG. 13 illustrates an example of a UE configured with multiple DL cells not being able to determine which DL SAs it missed in case of the DL DAI design in FIG. 10 according to an exemplary embodiment of the present invention.

Referring to FIG. 13, a UE is configured with a TM enabling the reception of 2 TBs per subframe in Cell 0 1310 and with a TM enabling the reception of 1 TB per subframe in Cell 1 1320 and Cell 2 1330. In DL subframe 1, the UE receives a DL SA in Cell 1, and based on the DAI IE value 1322 it becomes aware of a missed DL SA, which, as shown in FIG. 13, is missed DL SA 1215. However, as the UE cannot know whether the DL SA that it missed was in Cell 0, Cell 1, or Cell 2, there are two possible assumptions the UE can make; either 2 TBs were missed or 1 TB was missed. The former is the correct assumption, while the latter is incorrect and will lead to a misunderstanding of the HARQ-ACK payload between the UE and the NodeB. In DL subframe 2, the UE receives a DL SA in Cell 2 and based on the DAI IE value 1332 it becomes aware that it missed another DL SA, which, as shown in FIG. 13, is missed DL SA 1325. As the UE cannot know whether the DL SA it missed was in Cell 0, Cell 1, or Cell 2, there are again two possible assumptions the UE can make; either the UE missed 2 TBs or the UE missed 1 $TB_{max}$ The latter is the correct assumption while the former is incorrect and will lead to a misunderstanding between the UE and the NodeB of the HARQ-ACK payload. Obviously, if the UE generates HARQ-ACK bits according to the configured TM in each cell, it is not possible to achieve the same understanding of the HARQ-ACK payload between the NodeB and the UE when DL SAs are missed.

In order to achieve the same understanding at a UE and the NodeB for the payload and proper ordering of the HARQ-ACK bits, the UE should always generate HARQ-ACK bits corresponding to the TM enabling reception for the largest number of TBs regardless of the TM configured in a particular cell.

Figure 14:
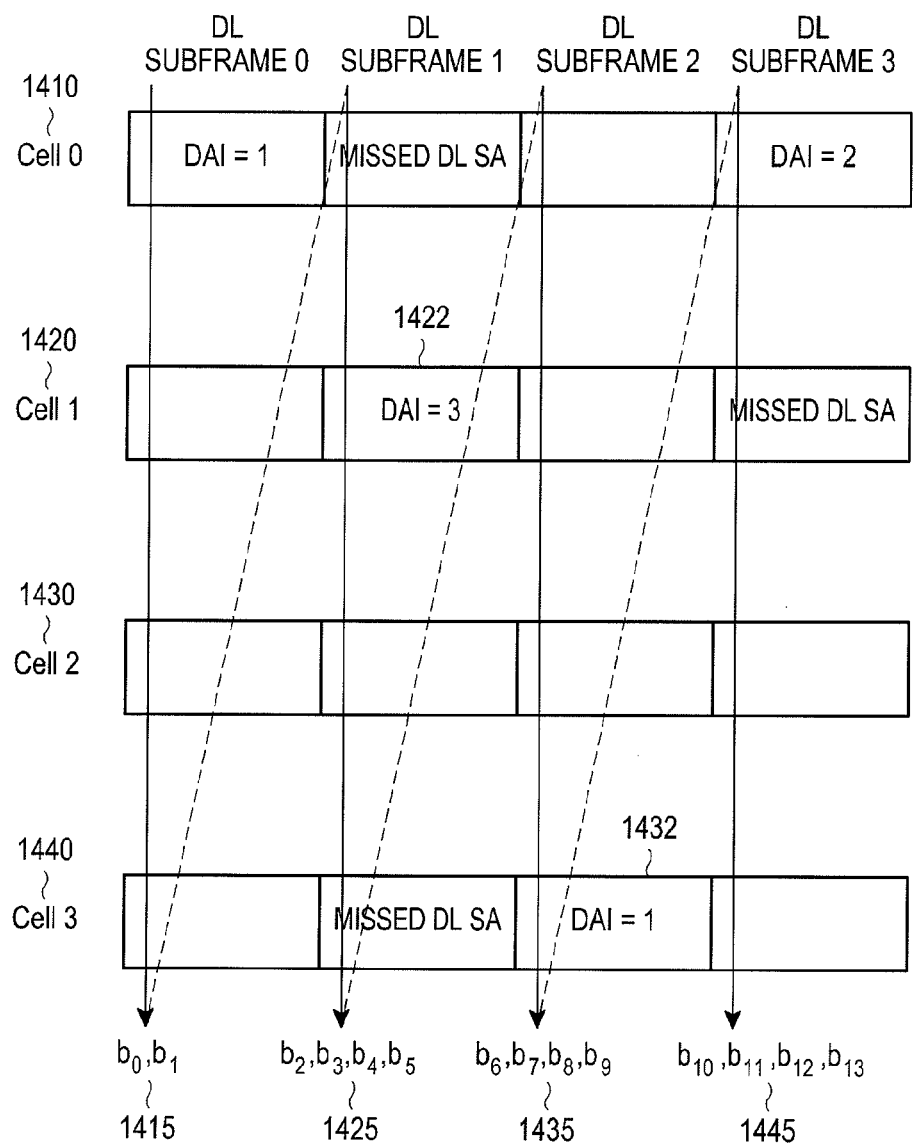
FIG. 14 is a diagram illustrating a process for a UE configured with multiple DL cells to determine the HARQ-ACK payload for the DL DAI design in FIG. 10 according to an exemplary embodiment of the present invention.

FIG. 14 illustrates a process for a UE configured with multiple DL cells to determine the HARQ-ACK payload for the DL DAI design in FIG. 10 according to an exemplary embodiment of the present invention.

Referring to FIG. 14, a UE is configured to have a TM enabling the reception of 2 TBs per subframe in Cell 0 1410 and a TM enabling the reception of 1 TB per subframe in Cell 1 1420, Cell 2 1430, and Cell 3 1440. As the UE is configured to have a TM enabling reception of 2 TBs in at least one cell, it generates 2 HARQ-ACK bits for every DL SA it identifies regardless of the TM of the respective cell. In DL subframe 0, the UE receives a DL SA for Cell 0 and generates 2 respective HARQ-ACK bits b0, b1 1415. In DL subframe 1, the UE receives a DL SA for Cell 1, and based on the respective DL DAI IE value 1422 the UE determines that there was a missed DL SA. Then, the UE generates 4 respective HARQ-ACK bits b2, b3, b4, b5 1425. In DL subframe 2, the UE receives a DL SA for Cell 3, and based on the respective DL DAI IE value 1432, the UE determines that there was a missed DL SA. Then, the UE generates 4 respective HARQ-ACK bits b6, b7, b8, b9 1435. Finally, in DL subframe 3, the UE receives a DL SA for Cell 0 but also generates 2 additional HARQ-ACK bits in case the UE missed a next DL SA at the end of a cell. Therefore, the UE generates 4 respective HARQ-ACK bits b10, b11, b12, b13 1445. This assumes that a probability that the UE misses more than one of the last DL SAs at the end of a cell is negligible. Otherwise, the UE may generate multiple pairs of HARQ-ACK bits corresponding to the multiple possible missed DL SAs after the last missed DL SA that the UE was aware of, as previously discussed above.

Assuming that a UE can determine $N_{DAI}^{DL}$, DL SAs based on the DL DAI IE values, $N_{DAI}^{DL}=N_{reset} \cdot N_{bundle}+V_{DAL,\,last}^{DL}$, and by denoting $TB_{max}$ to be the maximum number of TBs for any configured TM in any cell (wherein $TB_{max}$ is 1 or 2, and wherein $TB_{max}$ is always 1 if spatial bundling is applied) and by $Q_{add}$ being the number of additional DL SAs assumed to have been missed by the UE after the last received DL SA (it is noted that $Q_{add}$ may be configured for the UE by the NodeB and appropriately reduced if the UE correctly receives $Q_{add}$ or less of the last DL SAs), then the HARQ-ACK payload is (assuming that DTX is mapped to a NACK) given by Equation (12).

$$O_{HARQ-ACK}=(N_{DAI}^{DL}+Q_{add}) \cdot TB_{max} \quad \text{Equation (12)}$$

As the HARQ-ACK payload in Equation (12) may be smaller than the one in Equation (11), particularly if spatial domain bundling is applied, Equation (12) may be used to determine the HARQ-ACK payload in a case where the transmission is in the PUSCH.

The approach used in Equation (12) can also be followed for the DL DAI design in FIG. 9 in order to reduce the HARQ-ACK payload compared to Equation (11), assuming that the probability of the UE missing 2 consecutive DL SAs is negligible. Thus, the HARQ-ACK payload is given by Equation (13).

$$O_{HARQ-ACK} = \sum_{c=0}^{C-1} (N_{DAI}^{DL}(c) + Q_{add}(c)) \cdot TB_{max}(c) = \quad \text{Equation (13)}$$

$$\sum_{c=0}^{C-1} (V_{DAI,last}^{DL}(c) + Q_{add}(c)) \cdot TB_{config}(c)$$

where $N_{DAI}^{DL}(c)=V_{DAI,\,last}^{DL}(c)$ is the number of DL SAs that the UE determines to be transmitted from the NodeB during the bundling window in cell c, wherein $Q_{add}(c)=0$ if the DL SA in the last DL subframe of cell c is correctly received while $Q_{add}(c)=1$ otherwise. Therefore, for the DL DAI design in FIG. 9, the UE will generate HARQ-ACK information for 3 DL SAs in Cell 0, for 2 DL SAs in Cell 1, and for 3 DL SAs in Cell 2, and the same understanding exists at the NodeB.

Next, a case wherein the UL SA exists will be discussed. If a UE receives an UL SA for a PUSCH transmission in the same UL subframe as the expected HARQ-ACK signal transmission, and the HARQ-ACK information is included in that PUSCH, the related art UL DAI IE cannot be directly re-used as it corresponds only to a single cell and PUSCH transmission may not exist in all cells.

Figure 15:
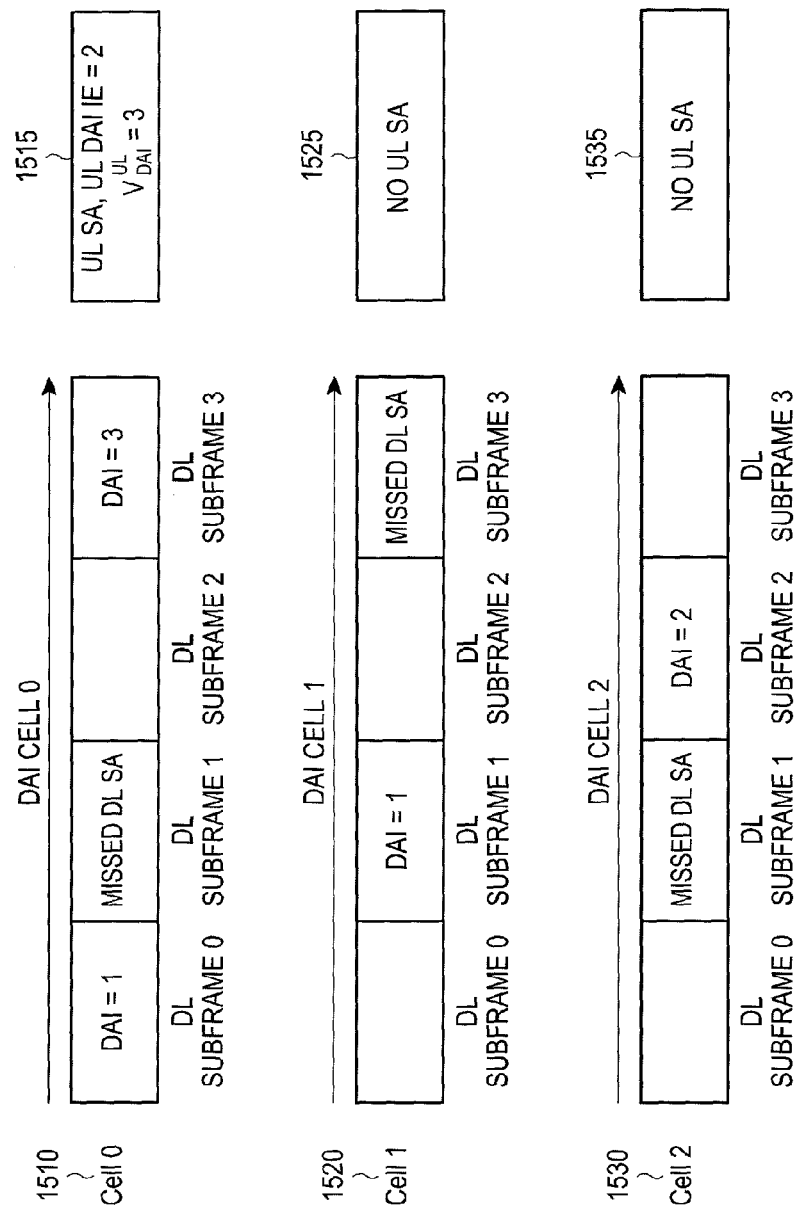
FIG. 15 is a diagram illustrating the inability of the related art interpretation of a UL DAI IE in an UL SA to indicate the HARQ-ACK payload a UE should transmit in a respective PUSCH is response to the reception of multiple PDSCH over a bundling window in respective multiple cells for the DL DAI design in FIG. 9 based on the setup of FIG. 11 according to an exemplary embodiment of the present invention.

FIG. 15 illustrates the inability of the related art interpretation of a UL DAI IE in an UL SA to indicate the HARQ-ACK payload a UE should transmit in a respective PUSCH is response to the reception of multiple PDSCH over a bundling window in respective multiple cells for the DL DAI design in FIG. 9 based on the setup of FIG. 11 according to an exemplary embodiment of the present invention. The same arguments apply for the DL DAI design in FIG. 10.

Referring to FIG. 15, in Cell 0 1510, a UE receives an UL SA with an UL DAI IE indicating that the UE needs to include HARQ-ACK bits corresponding to 3 DL SAs, $V_{DAI}^{UL}=3$. As Cell 0 is assumed to be configured to have a TM enabling reception of 2 TBs, then, if spatial bundling does not apply, the interpretation of the UL DAI IE should be for multiples of 2 HARQ-ACK bits per DL SA and therefore a value of $V_{DAI}^{UL}=3$ indicates 6 HARQ-ACK bits to be included in the PUSCH transmission. Nevertheless, as in Cell 1 1520 and Cell 2 1530 the UE does not receive a UL SA 1525 and 1535, respectively, the UL DAI IE received in Cell 0 cannot serve the purpose of informing the UE of the number of HARQ-ACK bits it needs to include in the respective PUSCH transmission.

One approach to circumvent the limitations of the related art UL DAI IE, in a case of DL CA, is to consider application of the UL DAI IE over all cells under the assumption that the probability that the UE misses 4 or more DL SAs is negligible (the UL DAI IE is assumed to consist of 2 bits). Then, the interpretation of the UL DAI IE may be considered jointly with the DL DAI IE values.

For the DL DAI design of FIG. 13, based on the DL DAI IE values in Cell 0, a UE knows that NodeB transmitted 2 DL SAs to the UE. Based on the DL DAI IE values in Cell 1, the UE knows that the NodeB transmitted 1 DL SA, that the UE missed 1 DL SA, and the UE cannot be aware of the missed DL SA in the last DL subframe of the bundling window. Based on the DL DAI IE in Cell 2, the UE knows that the NodeB transmitted 1 DL SA and that the UE missed 1 DL SA. Therefore, the UE can know that the NodeB transmitted 6 DL SAs and that 2 of them were missed by the UE.

The UL DAI IE value is effectively interpreted modulo 4 (assuming 4 DL subframes in the bundling window) and a value of $V_{DAI}^{UL}=3$ indicates that either 3, or 7 DL SAs were transmitted by the NodeB to the UE. Therefore, if from the DL DAI IE, the UE determines that the NodeB transmitted 6 DL SAs, a value of $V_{DAI}^{UL}=3$ is interpreted as indicating that the NodeB transmitted 7 DL SAs to the UE. If the UE can determine, based on the DL DAI IE values, that the NodeB transmitted $N_{DAI}^{DL}$ SAs to the UE, and the UE is informed of $V_{DAI}^{UL}$ DL SAs through the UL DAI IE value, then the UE determines the total number $N_{SA,total}^{DL}$ of DL SAs the NodeB transmitted to the UE as given in Equation (14).

$$N_{SA,total}^{DL}=N_{DAI}^{DL}+V_{DAI}^{UL}-\mathrm{mod}(N_{DAI}^{DL},4) \quad \text{Equation (14)}$$

Although the above described approach can identify the total number of DL SAs that the NodeB transmits to the UE, it is still inadequate for identifying a proper placement of the HARQ-ACK bits in the transmitted codeword. For example, in FIG. 15, although the UE can identify that it missed a DL SA, it cannot identify whether this DL SA was in the last DL subframe of Cell 1 or in the last DL subframe of Cell 2, and consequently it cannot know the proper ordering for the HARQ-ACK information unless the HARQ-ACK information is assumed to apply for all cells, as shown in Equation (15).

$$O_{HARQ-ACK}=(N_{DAI}^{DL}+V_{DAI}^{UL}-\mathrm{mod}(N_{DAI}^{DL},4))\cdot TB_{max} \quad \text{Equation (15)}$$

The above uncertainty can be resolved by using the UL DAI IE value to indicate a same number of DL SAs transmitted in all cells regardless of the actual number of DL SAs transmitted in each cell. For example, in FIG. 13 or FIG. 15, the UL DAI IE indicates that there are 3 DL SAs in every cell although the number of actual DL SAs in some cells, such as cell 1, is 2.

Figure 16:
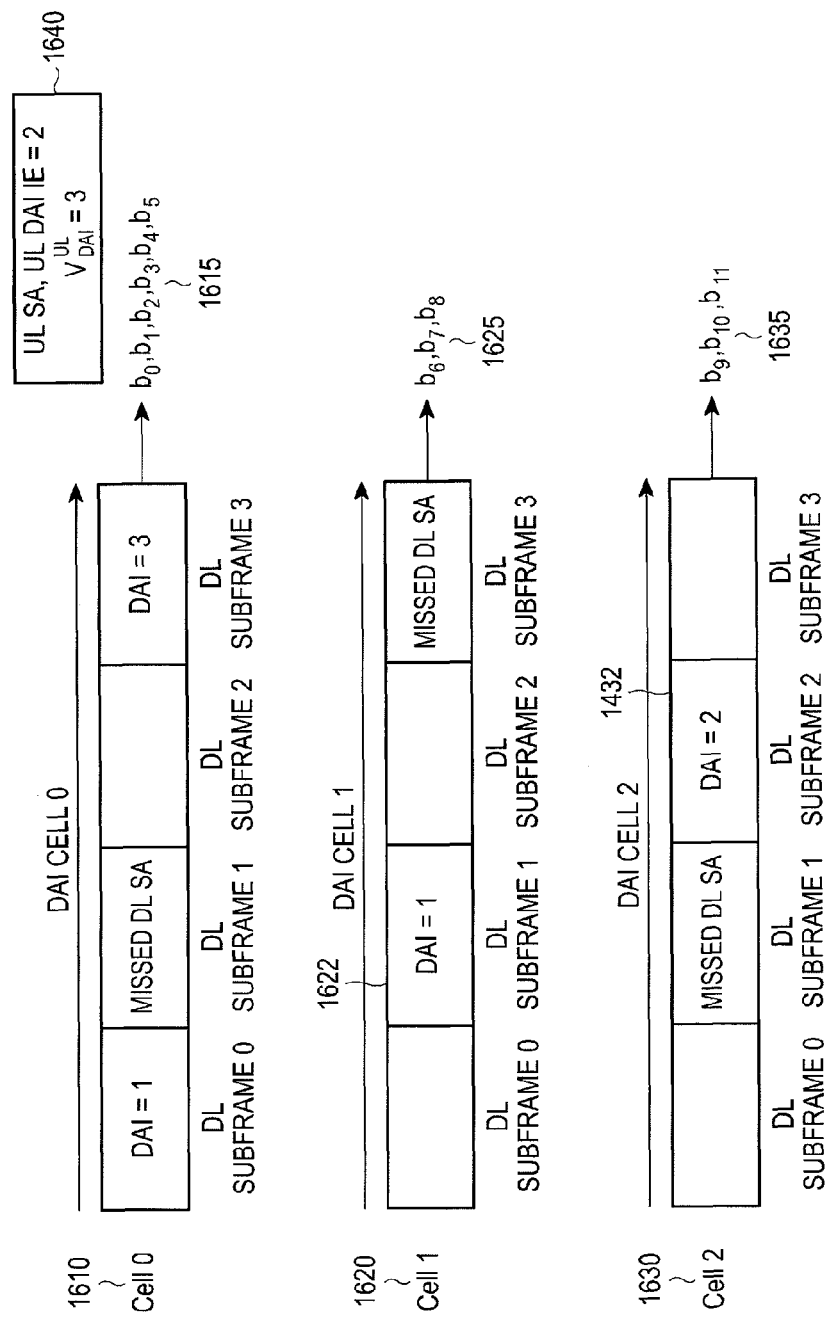
FIG. 16 is a diagram the use of the UL DAI IE in a UL SA for a PUSCH where a UE multiplexes HARQ-ACK information to determine the HARQ-ACK payload and ordering for the DL DAI design in FIG. 9 or in FIG. 10 according to an exemplary embodiment of the present invention.

FIG. 16 illustrates the use of the UL DAI IE in a UL SA for a PUSCH where a UE multiplexes HARQ-ACK information to determine the HARQ-ACK payload and ordering for the DL DAI design in FIG. 9 or in FIG. 10 according to an exemplary embodiment of the present invention.

Referring to FIG. 16, based on the UL DAI value $V_{DAI}^{UL}=3$, a UE generates HARQ-ACK bits assuming that the NodeB transmitted 3 DL SAs in each DL cell. A predetermined ordering of cells is assumed, such as one based on the Cell_Index. For the DL SAs it receives, the UE generates a HARQ-ACK corresponding to the outcome of the respective reception of TBs, whether the outcome is correct or incorrect. In Cell 0 1610, the UE can identify that it received 3 DL SAs and, as it is assumed to have been configured with a TM enabling the reception of 2 TBs, the UE generates 6 respective HARQ-ACK bits 1615. However, it should be noted that if spatial bundling is used, 3 HARQ-ACK bits are generated.

In Cell 1 1620, the UE can identify that it received 1 DL SA and that the DL SA has a DL DAI IE value 1622 of 1. As the UL DAI IE indicates 3 DL SAs 1640, the UE generates 2 additional HARQ-ACK bits placed after the first of the HARQ-ACK bits for a total of 3 HARQ-ACK bits 1625 (the UE is assumed to have been configured with a TM enabling the reception of 1 TB in Cell 1). In Cell 2 1630, the UE can identify that it received 1 DL SA and that it has a DL DAI IE value 1432 of 2. As the UL DAI IE indicates 3 DL SAs 1640, the UE generates 2 additional HARQ-ACK bits with the first one placed before the HARQ-ACK bit corresponding to the TB reception in DL subframe 1 and the other placed after the HARQ-ACK bit corresponding to the TB reception for a total of 3 HARQ-ACK bits 1635. It should be noted that the UE is assumed to have been configured with a TM enabling the reception of 1 TB in Cell 2. Therefore, the HARQ-ACK payload is as described in Equation (16), $$O_{HARQ-ACK}=V_{DAI}^{UL}\cdot(C+C_2) \quad \text{Equation (16)},$$

and the HARQ-ACK payload in the PUSCH is reduced from a maximum of $O_{HARQ-ACK}=N_{bundle}\cdot(C+C_2)=16$ bits in Equation (11) to $O_{HARQ-ACK}=V_{DAI}^{UL}\cdot(C+C_2)=12$ bits.

Alternatively, instead of indicating the maximum number of DL SAs per cell, the UL DAI IE may indicate the total number of DL SAs over all cells. For example, this can be useful if spatial bundling is used since the configured TM in each cell does not affect the respective number of HARQ-ACK bits. The mapping of the UL DAI IE value to the total number of DL SAs can be configured for the UE by the NodeB. An example is shown below in Table 1. The UL DAI IE may also be extended to include additional bits in a case of DL CA in order to improve the granularity and accuracy of its indications. If a UE does not receive any DL SA, the UL DAI value of "11" is interpreted as 0.

TABLE 1

Mapping of UL DAI IE to total DL SAs a UE should assume in the bundling window.

| UL DAI MSB, LSB | $V_{DAI}^{UL}$ | Total DL SAs in bundling window $N_{DAI}^{UL}$ |
|---|---|---|
| 0, 0 | 1 | 4 |
| 0, 1 | 2 | 8 |
| 1, 0 | 3 | 12 |
| 1, 1 | 0 or 4 | 0 or 16 |

In a case where multiple UL SAs are received for PUSCH transmission in respectively multiple cells in the UL subframe associated with the DL subframe bundling window, a UE may not consider the UL DAI IE in any UL SA as valid if it does not have the same value in all UL SAs. Also, if based on the DL DAI IE, the UE needs to generate more than $O_{HARQ-ACK} = V_{DAI}^{UL} \cdot (C+C_2)$) bits, it may either transmit the HARQ-ACK payload determined from the DL DAI IE in a PUSCH or the UE may not transmit any PUSCH as, for proper system operation, this can be considered to represent an error case resulting from either the UE considering as valid an invalid DL SA or by considering as valid an invalid UL SA.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for wireless communication, the method comprising:
   receiving at least one transport block (TB) within a bundling window in a cell among configured cells;
   generating acknowledgement bits in response to the received at least one TB based on a number of the configured cells and a transmission mode of each of the configured cells; and
   transmitting the generated acknowledgement bits on a physical uplink control channel (PUCCH),
   wherein the generated acknowledgement bits comprise a number of bits corresponding to a size of the bundling window for a first configured cell having a transmission mode conveying a maximum of one TB and a number of bits corresponding to twice a size of the bundling window for a second configured cell having a transmission mode conveying a maximum of two TBs.

2. The method of claim 1, further comprising:
   determining a transmit power based on a number of the received at least one TB and a number of missed downlink scheduling assignments,
   wherein the generated acknowledgement bits are transmitted using the transmit power.

3. The method of claim 2,
   wherein the number of missed downlink scheduling assignments is derived from V_dl_dai_c and U_dai_c,
   wherein the V_dl_dai_c is a downlink assignment index (DAI) value included in a last downlink scheduling assignment detected within the bundling window in the cell, and
   wherein the U_dai_c is a total number of downlink scheduling assignments detected within the bundling window in the cell.

4. The method of claim 1, wherein the method is operated in a user equipment (UE) being configured by a base station to have the configured cells.

5. The method of claim 1, wherein the method is operated in a time division duplex (TDD) communication system.

6. A user equipment (UE) apparatus for wireless communication, the apparatus comprising:
   a transceiver configured to receive at least one transport block (TB) within a bundling window in a cell among configured cells and to transmit acknowledgement bits on a physical uplink control channel (PUCCH); and
   a controller configured to generate the acknowledgement bits in response to the received at least one TB based on a number of the configured cells and a transmission mode of each of the configured cells,
   wherein the generated acknowledgement bits comprise a number of bits corresponding to a size of the bundling window for a first configured cell having a transmission mode conveying a maximum of one TB and a number of bits corresponding to twice a size of the bundling window for a second configured cell having a transmission mode conveying a maximum of two TBs.

7. The apparatus of claim 6,
   wherein the controller is further configured to determine a transmit power based on a number of the received at least one TB and a number of missed downlink scheduling assignments, and
   wherein the generated acknowledgement bits are transmitted using the transmit power.

8. The apparatus of claim 7,
   wherein the number of missed downlink scheduling assignments is derived from V_dl_dai_c and U_dai_c,
   wherein the V_dl_dai_c is a downlink assignment index (DAI) value included in a last downlink scheduling assignment detected within the bundling window in the cell, and
   wherein the U_dai_c is a total number of downlink scheduling assignments detected within the bundling window in the cell.

9. The apparatus of claim 6, wherein the apparatus is configured by a base station to have the configured cells.

10. The apparatus of claim 6, wherein the apparatus is operated in a time division duplex (TDD) communication system.

11. A method for wireless communication, the method comprising:
    transmitting, to a user equipment (UE), at least one transport block (TB) within a bundling window in a cell among configured cells; and
    receiving acknowledgement bits on a physical uplink control channel (PUCCH),
    wherein the received acknowledgement bits are generated in response to the transmitted at least one TB based on a number of the configured cells and a transmission mode of each of the configured cells for the UE, and
    wherein the generated acknowledgement bits comprise a number of bits corresponding to a size of the bundling window for a first configured cell having a transmission mode conveying a maximum of one TB and a number of bits corresponding to twice a size of the bundling window for a second configured cell having a transmission mode conveying a maximum of two TBs.

12. The method of claim 11, wherein the received generated acknowledgement bits are transmitted, from the UE, using a transmit power determined based on a number of the transmitted at least one TB and a number of missed downlink scheduling assignments in the UE.

13. The method of claim 12,
wherein the number of missed downlink scheduling assignments is derived from V_dl_dai_c and U_dai_c,
wherein the V_dl_dai_c is a downlink assignment index (DAI) value included in a last downlink scheduling assignment transmitted within the bundling window in the cell, and
wherein the U_dai_c is a total number of downlink scheduling assignments transmitted within the bundling window in the cell.

14. The method of claim 11, wherein the method is operated in a base station configuring the UE to have the configured cells.

15. The method of claim 11, wherein the method is operated in a time division duplex (TDD) communication system.

16. A base station apparatus for wireless communication, the apparatus comprising:
a transceiver configured to transmit, to a user equipment (UE), at least one transport block (TB) within a bundling window in a cell among configured cells and to receive acknowledgement bits on a physical uplink control channel (PUCCH),
wherein the received acknowledgement bits are generated in response to the transmitted at least one TB based on a number of the configured cells and a transmission mode of each of the configured cells for the UE, and
wherein the generated acknowledgement bits comprise a number of bits corresponding to a size of the bundling window for a first configured cell having a transmission mode conveying a maximum of one TB and a number of bits corresponding to twice a size of the bundling window for a second configured cell having a transmission mode conveying a maximum of two TBs.

17. The apparatus of claim 16, wherein the received generated acknowledgement bits are transmitted, from the UE, using a transmit power determined based on a number of the transmitted at least one TB and a number of missed downlink scheduling assignments in the UE.

18. The apparatus of claim 17,
wherein the number of missed downlink scheduling assignments is derived from V_dl_dai_c and U_dai_c,
wherein the V_dl_dai_c is a downlink assignment index (DAI) value included in a last downlink scheduling assignment transmitted within the bundling window in the cell, and
wherein the U_dai_c is a total number of downlink scheduling assignments transmitted within the bundling window in the cell.

19. The apparatus of claim 16, further comprising:
a controller configured to configure the UE to have the configured cells.

20. The apparatus of claim 16, wherein the apparatus is operated in a time division duplex (TDD) communication system.

* * * * *